United States Patent
Chapman

(10) Patent No.: US 9,130,769 B2
(45) Date of Patent: Sep. 8, 2015

(54) UPSTREAM EXTERNAL PHY INTERFACE FOR DATA AND CONTROL PLANE TRAFFIC

(75) Inventor: John T. Chapman, Laguna Niguel, CA (US)

(73) Assignee: Cisco Technology, Inc., San Jose, CA (US)

(*) Notice: Subject to any disclaimer, the term of this patent is extended or adjusted under 35 U.S.C. 154(b) by 200 days.

(21) Appl. No.: 13/611,055

(22) Filed: Sep. 12, 2012

(65) Prior Publication Data

US 2013/0074138 A1 Mar. 21, 2013

Related U.S. Application Data

(60) Provisional application No. 61/535,715, filed on Sep. 16, 2011, provisional application No. 61/536,726, filed on Sep. 20, 2011, provisional application No. 61/565,102, filed on Nov. 30, 2011, provisional application No. 61/608,977, filed on Mar. 9, 2012.

(51) Int. Cl.
*H04L 12/28* (2006.01)
*H04L 12/24* (2006.01)
*H04N 21/258* (2011.01)
(Continued)

(52) U.S. Cl.
CPC ........ *H04L 12/2801* (2013.01); *H04L 41/0803* (2013.01); *H04N 21/2221* (2013.01); *H04N 21/25816* (2013.01); *H04N 21/6118* (2013.01); *H04N 21/6168* (2013.01); *H04N 21/64322* (2013.01); *H04N 21/64707* (2013.01); *H04L 61/2015* (2013.01)

(58) Field of Classification Search
CPC ..... H04L 43/08; H04L 43/0852; H04L 43/50; H04L 2012/64; H04L 12/64; H04L 64/102; H04L 29/06176; H04W 24/00; H04B 17/003; H04J 3/00; H04Q 11/04; H04Q 12/43
See application file for complete search history.

(56) References Cited

U.S. PATENT DOCUMENTS 6,728,239 B1 4/2004 Kung et al.
6,751,230 B1 6/2004 Vogel et al.
(Continued)

FOREIGN PATENT DOCUMENTS

WO 0119080 3/2001

OTHER PUBLICATIONS

International Search Report and Written Opinion in counterpart International Application No. PCT/US2012/054765, mailed Mar. 6, 2013.
(Continued)

*Primary Examiner* — Hassan Phillips
*Assistant Examiner* — Prenell Jones
(74) *Attorney, Agent, or Firm* — Edell, Shapiro & Finnan, LLC

(57) ABSTRACT

Techniques are provided for controlling downstream Converged Cable Access Platform (CCAP) access points. At the CCAP access point having a network interface and a coaxial interface, control plane information is received from a Cable Modem Termination System (CMTS) via the network interface, where the control plane information is designed to configure the CCAP access point to enable communication over the network interface and the coaxial interface. At the CCAP access point, data plane and control plane information is transmitted to the CMTS, and may include information from one or more customer termination devices.

24 Claims, 13 Drawing Sheets

(51) Int. Cl.
*H04N 21/61* (2011.01)
*H04N 21/643* (2011.01)
*H04N 21/222* (2011.01)
*H04N 21/647* (2011.01)
*H04L 29/12* (2006.01)

(56) References Cited

U.S. PATENT DOCUMENTS

| | | |
|---|---|---|
| 6,907,067 B1 | 6/2005 | Moeller et al. |
| 7,089,580 B1 | 8/2006 | Vogel et al. |
| 7,209,442 B1 | 4/2007 | Chapman |
| 7,639,617 B2 | 12/2009 | Chapman et al. |
| 7,688,828 B2 | 3/2010 | Chapman et al. |
| 7,701,951 B2 * | 4/2010 | Chapman et al. ........ 370/395.52 |
| 7,720,002 B1 | 5/2010 | Beser |
| 2002/0048268 A1 | 4/2002 | Menon et al. |
| 2003/0125021 A1 | 7/2003 | Tell et al. |
| 2003/0126610 A1 | 7/2003 | Ando |
| 2004/0181811 A1 | 9/2004 | Rakib |
| 2005/0024308 A1 | 2/2005 | Ishiyama |
| 2005/0265398 A1 | 12/2005 | Chapman et al. |
| 2006/0271988 A1 | 11/2006 | Chapman et al. |
| 2007/0180483 A1 | 8/2007 | Popoviciu |
| 2007/0195824 A9 | 8/2007 | Chapman et al. |
| 2008/0049621 A1 | 2/2008 | McGuire et al. |
| 2008/0094328 A1 | 4/2008 | Ishiyama |
| 2008/0134262 A1 | 6/2008 | Jung et al. |
| 2008/0165947 A1 | 7/2008 | Wang et al. |
| 2009/0016218 A1 | 1/2009 | Hong et al. |
| 2009/0049492 A1 | 2/2009 | Pantelias |
| 2009/0177820 A1 | 7/2009 | Ranade et al. |
| 2009/0310480 A1 * | 12/2009 | Bao et al. ................ 370/217 |
| 2009/0310596 A1 * | 12/2009 | Joyce et al. ............. 370/352 |
| 2010/0002719 A1 * | 1/2010 | Sowinski et al. ........ 370/458 |
| 2010/0005500 A1 * | 1/2010 | Cloonan et al. ........ 725/110 |
| 2010/0014531 A1 | 1/2010 | Pirbhai et al. |
| 2010/0083329 A1 * | 4/2010 | Joyce et al. ............. 725/110 |
| 2010/0154018 A1 | 6/2010 | Cho et al. |
| 2010/0177784 A1 * | 7/2010 | Asati et al. .............. 370/463 |
| 2010/0232638 A1 | 9/2010 | Leprince et al. |
| 2010/0254386 A1 | 10/2010 | Salinger et al. |
| 2010/0293264 A1 | 11/2010 | Ramsay |
| 2011/0058491 A1 | 3/2011 | Hsu et al. |
| 2011/0078755 A1 | 3/2011 | Dai |
| 2011/0150058 A1 * | 6/2011 | Oh ........................... 375/222 |
| 2011/0154424 A1 | 6/2011 | Lee |
| 2011/0302600 A1 | 12/2011 | Kelsen et al. |
| 2012/0075997 A1 * | 3/2012 | Salinger et al. ......... 370/236 |
| 2012/0178413 A1 | 7/2012 | Schliesser et al. |
| 2012/0321315 A1 * | 12/2012 | Timm et al. ............. 398/67 |
| 2013/0051225 A1 | 2/2013 | Pullen |
| 2013/0177023 A1 | 7/2013 | Salinger et al. |
| 2014/0143818 A1 | 5/2014 | Nielsen et al. |

OTHER PUBLICATIONS

CableLabs, "Operations Support System Interface Specification," Data-Over-Cable Service Interface Specifications, Converged Cable Access Platform, Aug. 9, 2012, pp. 1-402.
CableLabs, "Downstream External PHY Interface Specification," Data-Over-Cable Service Interface Specifications, Modular Headend Architecture, Jun. 11, 2010, pp. 1-152.
Modbus-IDA, "Modbus Application Protocol Specification V1.1b," http://www.Modbus-IDA.org, Dec. 28, 2006, pp. 1-51.
CableLabs, "EQAM Architectural Overview Technical Report," Data-Over-Cable Service Interface Specifications, Modular Headend Architecture, Dec. 9, 2008, pp. 1-39.
Office Action issued in European Application No. 12768947.9, dated Apr. 15, 2015, 5 pages.

* cited by examiner

UPSTREAM EXTERNAL PHY INTERFACE FOR DATA AND CONTROL PLANE TRAFFIC

This application claims the benefit of U.S. Provisional Application No. 61/535,715, filed Sep. 16, 2011; U.S. Provisional Application No. 61/536,726, filed Sep. 20, 2011; U.S. Provisional Application No. 61/565,102, filed Nov. 30, 2011; and U.S. Provisional Application No. 61/608,977, filed Mar. 9, 2012, which are incorporated herein by reference in their entireties.

TECHNICAL FIELD

The present disclosure relates to controlling Data-Over-Cable Service Interface Specification (DOCSIS) access point devices.

BACKGROUND

DOCSIS is a protocol that is used to send digital video and data between a hub or headend facility (HEF), and a cable modem (CM), gateway, or a set-top box at a customer premise. DOCSIS originates and terminates via a cable modem termination system (CMTS) at one end and a CM at the other end. For downstream and upstream transport, the digital data are modulated onto a Radio Frequency (RF) carrier or channel using Quadrature Amplitude Modulation (QAM) techniques. There are two types of CMTS architectures: 1) a CMTS with an integrated physical (PHY) layer and 2) a CMTS with a distributed PHY, e.g., on a separate PHY shelf collocated with the CMTS or a remote PHY that is further downstream and closer to the customer's end equipment. The CMTS with a distributed architecture is referred to as a modular CMTS (M-CMTS). In this context a PHY refers to the physical modulation and upconverter technology, and is sometimes referred to as a coaxial media converter (CMC).

To facilitate some markets, a third CMTS architecture has been specified by the cable industry's governing body, CableLabs® that supports conventional video in addition to DOCSIS, and is referred to as a Converged Cable Access Platform (CCAP). When the QAM is physically removed from an integrated CMTS and placed downstream it is known as an edge QAM (EQAM) or downstream PHY device. Thus, the CCAP architecture allows DOCSIS and existing video distribution to be combined downstream, thereby allowing network component reuse to reduce overall costs. While providing a more modular architecture, these downstream physical layer devices have a disadvantage in that they each must be manually configured by a network administrator for many of their operating parameters and are not configured with an integrated upstream equivalent of their downstream capability.

BRIEF DESCRIPTION OF THE DRAWINGS

The features and advantages of a control plane for configuring remote DOCSIS devices of the present disclosure will become apparent upon consideration of the following description of example embodiments thereof, particularly when taken in conjunction with the accompanying drawings wherein like reference numerals in the various figures are utilized to designate like components.

DESCRIPTION OF EXAMPLE EMBODIMENTS

Overview

Techniques are provided herein for receiving at a CCAP access point having a network interface and a coaxial interface, control plane information from a CMTS via the network interface, where the control plane information is designed to configure the CCAP access point to enable communication over the network interface and the coaxial interface. At the CCAP access point, DOCSIS data plane information and control plane information is received from the CMTS, and the data plane information is transmitted via the coaxial interface to one or more DOCSIS termination devices, e.g., a set-top gateway or CM. Some of the control plane information may also be transmitted to the CM.

Techniques are also provided herein for a master device to generate a GCP control message that is configured to manage a slave device, where the control message includes one or more of structured access fields and register access fields, and where the structured access fields include one or more of (i) a device management message configured to provide basic device control and (ii) an exchange data structure message configured with a payload field configured to store a data structure from another protocol, and where the register access fields include one or more of (i) an exchange data registers message configured to read and write to a register in the slave device and (ii) a mask write register message configured to write to individual bits of a register in the slave device. The control message is transmitted to the slave device.

Techniques are further provided herein for generating at a Modular Cable Modem Termination System (M-CMTS) core, one or more first control messages comprising information to configure one or more pathways with an access point for data plane and control plane communication. The one or more first control messages are transmitted to the access point. One or more second control messages is received from the access point, where at least one second control message is forwarded from a customer premise equipment (CPE).

Example Embodiments

Figure 1:
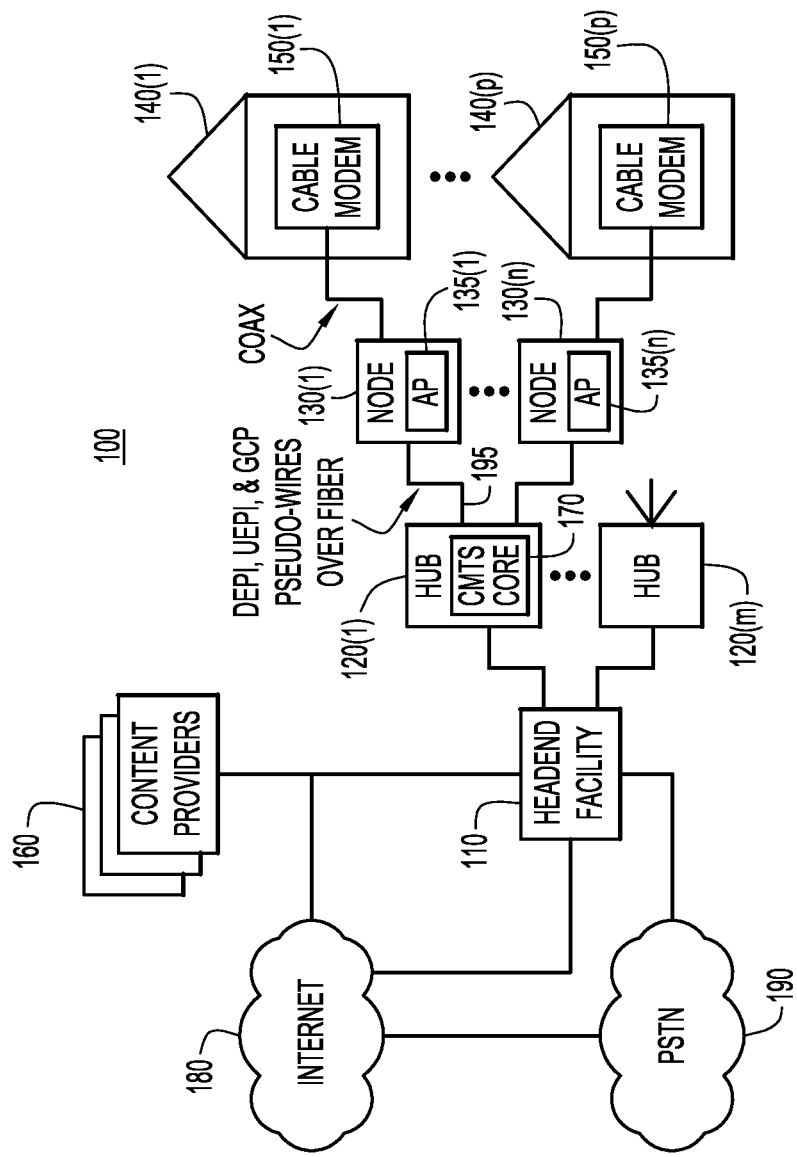
FIG. 1 is an example block diagram of a cable television distribution system employing control plane pseudowires according to the techniques described herein.

Referring to FIG. 1, an example cable system or network 100 is shown. Specifically, the system 100 includes a headend facility (HEF) 110, a plurality of hubs 120(1)-120(m), a plurality of nodes 130(1)-130(n), and a plurality of customers 140(1)-140(p). Each of the hubs 120 or HEF 110 may have a cable modem termination system (CMTS) core such as CMTS core 170 shown in hub 120(1). Each of the nodes 130(1)-130(n) has a one or more corresponding access points (APs) 135(1)-135(n), while each of the customers 140(1)-140(p) has a one or more corresponding CMs 150(1)-150(p). The APs 135(1)-135(m) may be considered to be CCAP access points.

The HEF 110 is coupled to the Internet 180, content providers 160, and Public Switched Telephone Network 190, to provide these services to customers 140(1)-140(p). The HEF 110 is connected to various content providers 160 for providing media content (e.g., movies, television channels, etc.). The content is further distributed by hubs 120(1)-120(m) to plurality of nodes. In this example, hub 120(1) distributes content to nodes 130(1)-130(n). Nodes 130(1)-130(n) distribute content to various customers, e.g., node 130(1) distributes the content to customer 140(1) in the form of conventional digital or Internet Protocol (IP) television.

In this example, nodes 130(1)-130(n) communicate via optical fibers with hub 120(1) and via coaxial (coax) cable to customer premises 140(1)-140(p), and as such, the combination of fiber and coax is known as a hybrid fiber coax (HFC) network (any combination of fiber and coax, may be used anywhere in system 100). CMTS core 170 is used to provide high speed data services including cable Internet, voice over IP (VoIP), and IP television services to various subscribers.

The HEF 110 is coupled to Internet 180 and PSTN 190 for providing Internet and telephony services (e.g., to and from customer 140(1)-140(p)). Media content may also be distributed by content providers 160 via Internet 180. Each of the hubs 120(1)-120(m) may also be coupled to Internet 180 and PSTN 190. DOCSIS is used to convey Internet or other packet based networking information, as well as packetized digital video between CMTSs and CMs.

DOCSIS may be carried between CMTS core 170 and node 130(1) using fiber optic or other medium at the physical layer. The physical (PHY) layer may be referred to herein simply as a downstream PHY or PHY layer. At node 130(1), CCAP AP 135(1) converts the downstream optical PHY to downstream coaxial PHY for transmission to CM 150(1). Similarly, CCAP AP 135(1) converts the upstream coaxial PHY to upstream optical PHY for transmission to CMTS core 170. CCAP AP 135(1) may also provide Media Access Control (MAC) protocol layer services. In other M-CMTS designs, the CCAP access point may be collocated with the M-CMTS as part of a PHY shelf. These operations will be described in greater details in connection with FIG. 2.

Traditional or existing M-CMTS architectures employ a downstream PHY, e.g., a fiber node, which houses one or more EQAMs to provide radio frequency (RF) modulation for downstream transmission. It should be understood that various electrical-to-optical (E/O) and optical-to-electrical (OLE) conversions may take place along the downstream and upstream DOCSIS pathways, with a coaxial PHY ultimately presented at the customer premise, e.g., at CMs 150(1)-150(p). The downstream nodes can employ an Internet Protocol (IP) tunnel that encapsulates DOCSIS according to the Downstream External-PHY Interface (DEPI) specification. While DEPI provides some control plane information, this information may be limited to the DOCSIS realm. As such, hardware, firmware, and/or software components of the CCAP access point are configured manually, e.g., or whether the EQAM will use QAM-64 or QAM-256 modulation as is known in the art. Some downstream parameters may be configured using DEPI. The CCAP access point's IP address and station ID are traditionally configured manually.

According to the techniques described herein, a control plane tunnel is added that facilitates configuration of a CCAP access point, the CCAP access point having an architecture that interfaces with the control plane tunnel. The control plane tunnel uses a new protocol referred to as Generic Control Protocol (GCP) that will be further described hereinafter. In addition, an upstream External-PHY Interface (UEPI) tunnel is introduced that performs an upstream function corresponding to DEPI, since upstream communication is often operated over a separate communication pathway. UEPI operation is also described hereinafter.

The GCP, DEPI, and UEPI tunnels may be referred to as pseudowires as indicated by link 195 between CMTS core 170 and node 130(1). A pseudowire is a network connection that encapsulates a point-to-point protocol using a packet network protocol, where the encapsulation is transparent to the point-to-point endpoints. Many pseudowires carry time sensitive data or protocols that require synchronization and therefore use a timing source. The pseudowires may be facilitated, e.g., by Multi-Protocol Label Switching (MPLS) or Layer 2 Tunneling Protocol version 3 (L2TPv3). Note that technically, GCP is not a pseudowire, per se, since it carries control plane information, but for ease of description, GCP may be conceptually thought of as a pseudowire. Any node or access point in system 100 may include hardware and software provisioned to implement the techniques described herein may be configured in a manner as described for node 130(1) and/or AP 135(1).

Figure 2:
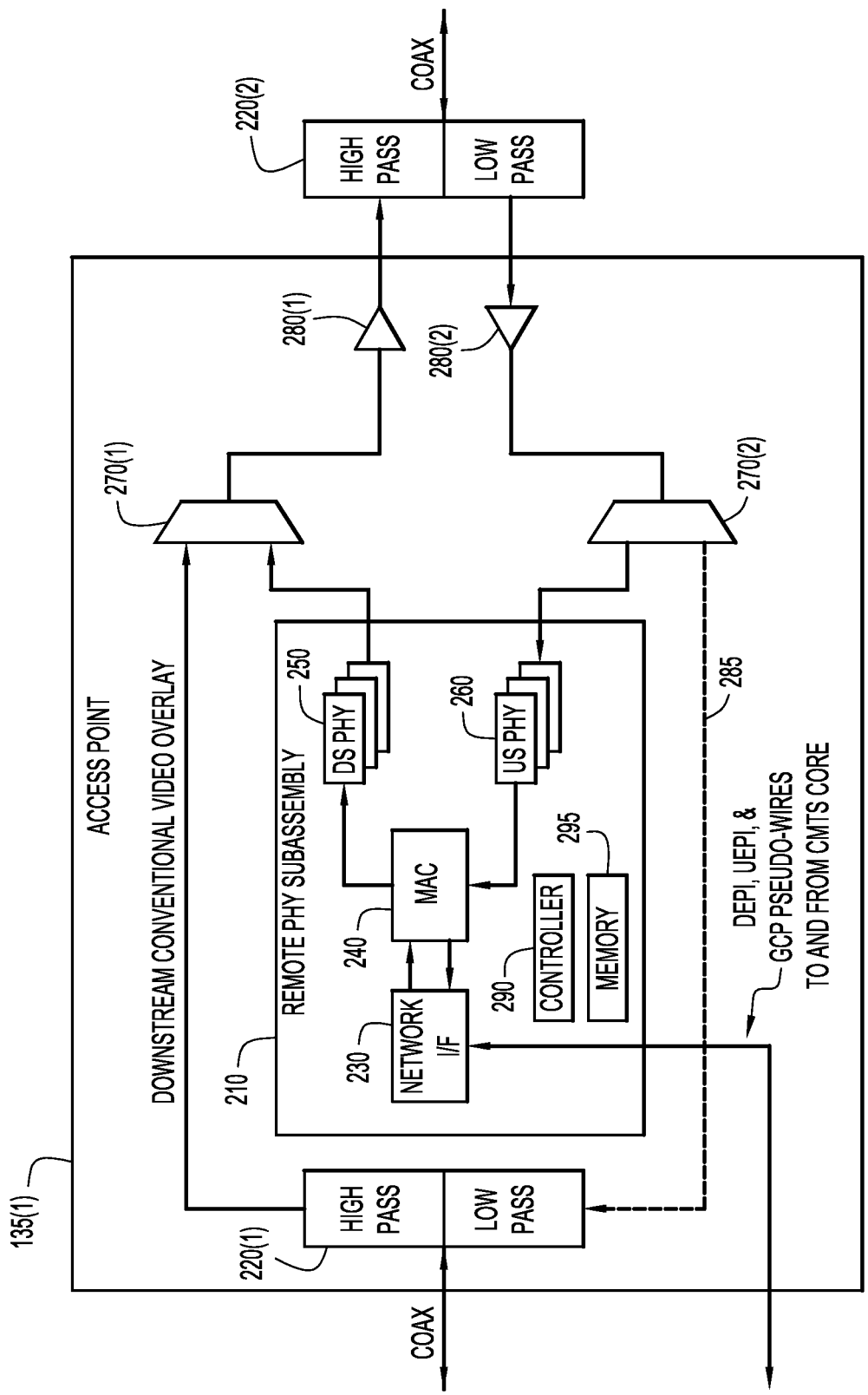
FIG. 2 is an example block diagram of a CCAP access point housed within the nodes shown in FIG. 1 that is configured to connect to the CMTS via pseudowires.

An example block diagram of a CCAP access point, e.g., AP 135(1), housed within the nodes shown in FIG. 1 is illustrated in FIG. 2. CCAP AP 135(1) is configured to connect the CMTS core via GCP, DEPI, and UEPI pseudowires and to a plurality of CMs, e.g., CMs 150(1)-150(p). AP 135 (1) may contain optional high and low pass filters or diplexers 220(1) and 220(2), as well as optional upstream and downstream amplifiers 280(1) and 280(2) to facilitate one or more downstream and upstream pass through connections. A pass through connection may be used for video overlays or other bypass signaling, e.g., for switched digital video (SDV) sent from another device or system. For example, some downstream spectrum can be allocated to headend supplied video, e.g., video on demand (VOD) or switched digital video (SDV), while other spectrum is allocated for DOCSIS. The pass through connection may contain an in-line attenuator to match the power of the pass through video with the output power of remote PHY subassembly at combiner 270(1).

In other examples, the CCAP AP is an optical node, a CCAP external PHY, or DOCSIS PHY. These devices can be remote to the CMTS or part of a PHY shelf with the CMTS core. Video can be encapsulated in DEPI and controlled by GCP.

AP 135(1) comprises a remote PHY subassembly 210 for converting, e.g., a downstream incoming PHY layer to a downstream coaxial PHY layer for transmission to a downstream device, e.g., CM 150(1). Remote PHY subassembly 210 includes a network interface (UF) 230, a MAC layer interface 240, a plurality of downstream (DS) PHY transmitters 250, a plurality of upstream (US) PHY receivers 260, a controller 290, and memory 295. Combiner 270(1) combines video overlay with DOCSIS from DS PHYs 250 for downstream forwarding and splitter 270(2) splits the DOCSIS upstream to US PHYs 260.

For the video or other bypass mechanisms, PHY layer downstream video overlay is received at diplexer 220(1) and forwarded by way of the high pass filter to combiner 270(1)

and is further filtered by the high pass side of diplexer 220(2). On the upstream side, diplexer 220(2) passes lower frequency RF upstream components, e.g., non-DOCSIS CM upstream signals, and blocks high frequency RF components that may interfere with downstream communication. Splitter 270(2) also splits the upstream signal to diplexer 220(1) along an optional (dashed) return path 285. Return path 285 is optional because a DOCSIS return path is provided via network interface 230.

The network interface 230 interfaces the DOCSIS upstream and downstream with an M-CMTS core, e.g., CMTS core 170. The network interface 230 may comprise, e.g., one or more of an optical interface, an Ethernet over a passive optical network (EPON) interface, a Gigabit Ethernet over a passive optical network (GPON) interface, an Ethernet interface, and an electrical network interface. MAC layer 240 decapsulates the MAC and forwards the frame, and encapsulates the MAC layer for upstream transmission, e.g., UEPI encapsulation. For example, the MAC layer 240 detects incoming packets or frames using start of frame and end of frame delimiters. Before forwarding the frame for further processing, the MAC layer may prepend an internal header onto the frame that provides upstream or downstream flows with details such as ingress port, type of port, ingress Virtual Local Area Network (VLAN), frame quality of service (QoS) markings, and a timestamp indicating when the frame entered the AP. The MAC layer 240 may also check that the received downstream frame contains no errors by validating its cyclic redundancy check (CRC). The MAC layer 240 may provide any formatting necessary, drop outdated frames, and add or remove the appropriate header information.

On the downstream side, DOCSIS streams, by way of MAC, or other information, is forwarded to the plurality of DS PHYs 250 for reception by a plurality of DS devices, e.g., CMs 150(1)-150(p). The plurality of DS PHYs will modulate the various DOCSIS downstreams or flows on the appropriate RF channel to CMs 150(1)-150(p). The plurality of DS PHYs is combined with video overlays by combiner 270(1). For the return or upstream path, DOCSIS streams are divided from bypass streams by splitter 270(2). The DOCSIS upstream flows are received by the plurality of upstream PHYs 260, processed by MAC interface 240, and forwarded by network interface 230 to CMTS core 170. The MAC interface 240 encapsulates the upstream packets for transmission to CMTS core 170.

In order to facilitate downstream and upstream flows, remote PHY subassembly 210 may include a controller 290 and memory 295, or other facilitating hardware, firmware, and software. Controller 290 and/or memory 295 may be connected to any of the components in AP 135(1), e.g., via a circuit board or other interface. By virtue of the techniques described herein, controller 290 and memory 295 may implement parts of a dynamic CCAP access point configuration process described in further detail in connection with FIGS. 3 and 4.

Memory unit 295 stores data and/or software or processor instructions that are executed to operate the AP 135(1) by controller 290. The DEPI and UEPI pseudowires carry DOCSIS data and control plane information, while AP 135(1) configuration information is conveyed via GCP. The controller 290 may be a microcontroller, processor, field programmable gate array (FPGA), application specific integrated circuit (ASIC), and the like. The controller 290 is programmed to configure the various components in AP 135(1). The memory 295 may be provided to facilitate the techniques described herein that is separate or part of the controller 290. Any form of non-transitory tangible or computer readable media may be provided, e.g., random access memory (RAM) or flash memory. The interface unit 230 may be equipped with a wireless (e.g., Wi-Fi®/Long Term Evolution (LTE)) or wired network interface (e.g., Ethernet) so that GCP control programming information or packet based information may be exchanged. Similar hardware memory, processors, and software elements may be present throughout network 100, e.g., CMTS 170 has such processing capability.

Ultimately, GCP allows one device to control another device. GCP allows the reuse of data bus structures from other protocols, and thus, allows direct read and/or write of hardware, firmware, and/or software configuration parameters to include reads and writes at the hardware register level to include any associated device interrupts and servicing any interrupt service routines (ISRs). GCP may include configuration of port, channels, frequencies, modulation schemes, and protocols. In some implementations there may be multiple controllers, e.g., a node controller and an ASIC controller. A first GCP connection between the M-CMTS core and node controller may use structured access (TLV) messages, while second GCP connection between the node controller and the ASIC controller may carry register access messages between the node controller and the ASIC controller.

Figure 3:
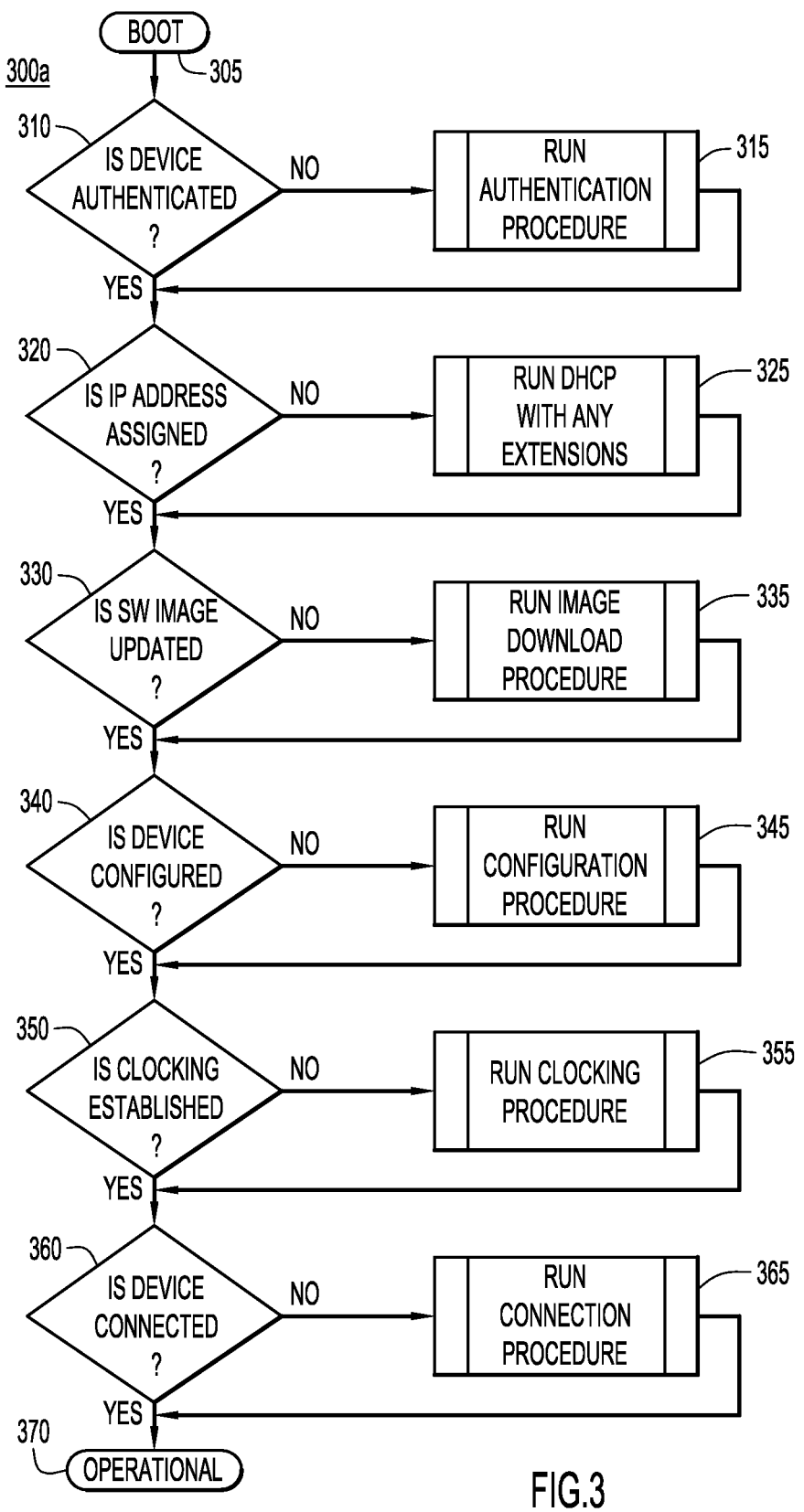
FIG. 3 is an example procedural flowchart illustrating the manner in which a CCAP access point configuration process may be implemented according to a first example.

Turning now to FIG. 3, an example procedural flowchart illustrating a specific example in which CCAP access point configuration process 300a may be implemented. A generic CCAP AP configuration process variation 300b is described in connection with FIG. 4. At 305, an access point, e.g., AP 135(1), is powered up or otherwise booted (e.g., via a hot, warm, or cold start). At 310, it is determined whether or not the AP is authenticated to the controlling network, e.g., by way of a network administration function within system 100 (FIG. 1). If the AP is not authenticated, at 315, the AP is authenticated using an approved authentication procedure, e.g., an IEEE 802.1X or Remote Authentication Dial In User Service (RADIUS) authentication procedure. After authentication, at 320, it is determined whether or not the AP has an assigned IP address. If the AP is not IP addressed, at 325, a Dynamic Host Configuration Protocol (DHCP) procedure (with any DHCP extensions) is run in order to assign an IP address to the AP.

Once the AP is assigned an IP address, it is determined, at 330, whether or not the AP has a current software and/or firmware image. When the image should be updated, at 335, an image download procedure is run, e.g., Trivial File Transfer Protocol (TFTP) or FTP. With an updated image, at 340, it is determined whether or not the AP is configured for downstream and upstream DOCSIS communication. When the AP is not configured, at 345, a device configuration procedure is run. Configuration of the AP entails an exchange of GCP messages between the configuration source, e.g., a headend facility or a CMTS core, and the AP, in order to set data rates, modulation schemes, frequencies or channels, etc. The GCP messages may be exchanged via a GCP tunnel as described above.

Once the AP is configured, it is determined, at 350, whether or not the AP has clocking or packet transfer timing is established. When clocking is not established, at 355, a clocking procedure is run, e.g., to establish IEEE 1588 timing or DOCSIS timing via a DOCSIS Timing Interface (DTI). In another example, and in certain implementations, DS and US clocking may be managed within the AP itself and an external timing source is unnecessary. At 360, it is determined whether or not the AP is connected in the sense that DEPI and UEPI tunnels are established. If not, at 365, the DEPI and UEPI tunnels are established, e.g., using L2TPv3 with the corresponding DEPI and UEPI extensions. Once the DEPI and UEPI tunnels are established, at 370, the AP is considered fully operational.

Figure 4:
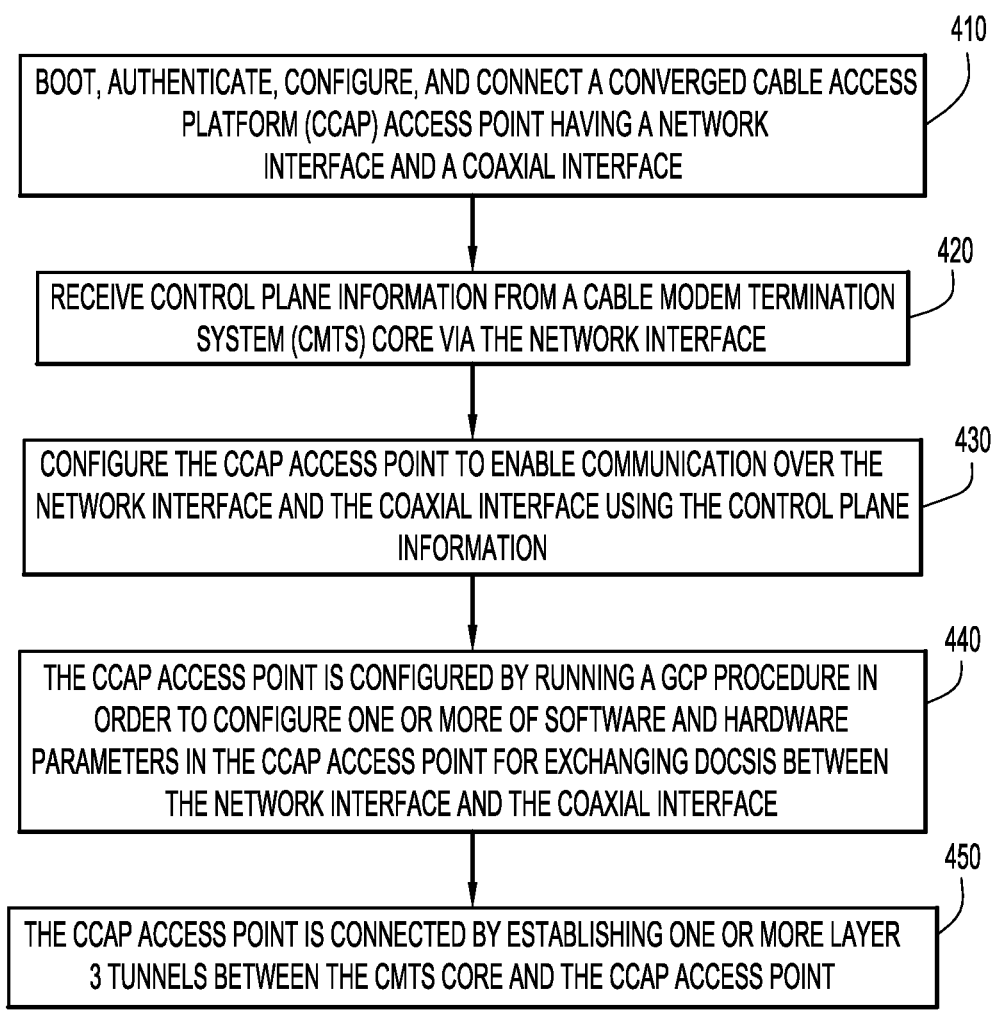
FIG. 4 is an example procedural flowchart illustrating the manner in which a CCAP access point configuration process may be implemented according to a second example.

Referring to FIG. 4, an example procedural flowchart illustrating the manner in which a CCAP access point configuration process may be implemented according to a generic second example is shown. At 410, the CCAP access point is booted, authenticated, configured, and connected; the AP having a network interface and a coaxial interface, as described above. The AP may be authenticated with an upstream authentication system. At 420, the AP receives control plane information from, e.g., a CMTS, via the network interface, e.g., network interface 230 (FIG. 2). At 430, the CCAP access point is configured to enable communication over the network interface and the coaxial interface using the control plane information. The coaxial interface may comprise one or more of a MAC layer and a PHY layer. The network interface comprises one or more of an optical interface, an EPON interface, a GPON interface, an Ethernet interface, and an electrical network interface.

At 440, the CCAP access point is configured by running a GCP procedure in order to configure one or more of software and hardware parameters in the CCAP access point for exchanging DOCSIS between the network interface and the coaxial interface. At 450, the CCAP access point is connected by establishing one or more layer 3 tunnels between the CMTS system and the AP. The layer 3 tunnels may be established via one or more of a DEPI, a UEPI, and a GCP pseudowire between the CMTS system and the CCAP access point.

GCP operations will now be described.

GCP Operation

GCP is a generic control plane protocol that exists between a master entity and a slave entity. Generally, the master entity controls the slave entity. GCP is able to re-use control plane concepts that are derived elsewhere but used in a new context, or control plane concepts otherwise derived anew. In this regard, it is typical for remote devices to require configuration. If the technology that is in a new remote device has been well defined in previous devices, then the previous data structures can be re-used within GCP. For example, if a PHY technology like QAM (Quadrature Amplitude Modulation) has been well defined in existing protocols such as the DOCSIS specified MAC and Upper Layer Protocols Interface (MULPI) Specification, then the TLV (Type Length Value) data structures in MULPI could be re-used in GCP for configuring this new device.

GCP also provides for existing state machines and software code to be leveraged. When GCP is used to tunnel the data structures from another protocol, the following nomenclature can be used: GCP (tag) where the tag is representative of the data structure being leveraged. For example, if the type-length-value (TLV) data structures from a DOCSIS UCD (Upstream Channel Descriptor) message (as defined in MULPI) are used over GCP, the result can be referred to as GCP (UCD).

GCP can read and write parameters, either directly to and from registers or with higher layer data structures. GCP can be used to reset, power up, or power down the device. The device can send the equivalent of a hardware interrupt via the GCP command structure. GCP allows chips that were previously embedded to be located across a network interface such as Ethernet.

Figure 5:
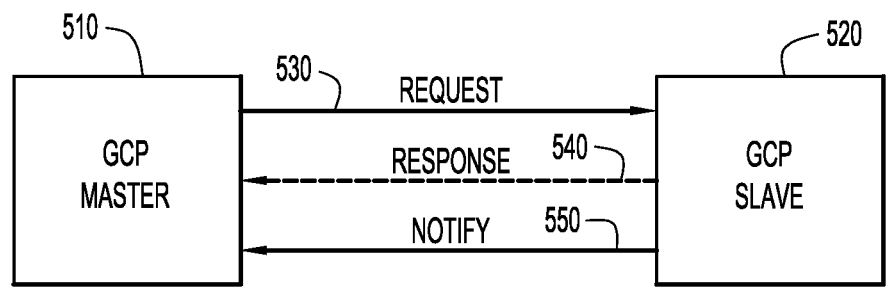
FIG. 5 is an example block diagram of messages that can be exchanged between a master device and a slave device.

Referring now to FIG. 5, a block diagram of a GCP master and slave device will be described. In this example, a GCP master device 510 is shown along with a GCP slave device 520. GCP master 510 sends a request message 530 to slave device 520. The GCP slave responds with an optional response message 540. When the slave 520 needs to communicate with the master 510, then the slave 520 can send a notify message 550. The notify message 550 may act as a software or hardware interrupt to the master 510 such that the master 510 can service the notify message 550 via an interrupt service routing (ISR).

GCP also has a peer-to-peer mode that permits both endpoints to simultaneously be both masters and slaves. The peer-to-peer mode operates as two independent master-slave modes, in opposite directions, e.g., on the same port number. It is acceptable for systems to implement a subset of the GCP message set. Accordingly, GCP is a framework from which other systems and protocol infrastructures can be built upon and re-used, if possible. GCP can be used in any architecture where devices are connected with a network. In other words, GCP may be used within a chassis or across a continent. GCP uses transport protocol such as Transmission Control Protocol (TCP) TCP/IP as its ultimate transport, so it is independent of both network topology and network technology. When TCP or equivalent reliable transport is used acknowledgement messages are not needed. Specifically, although Ethernet is often used as the layer 2 framing, any layer 2 framing could be used, or be replaced on a per-hop network basis.

Figure 6:
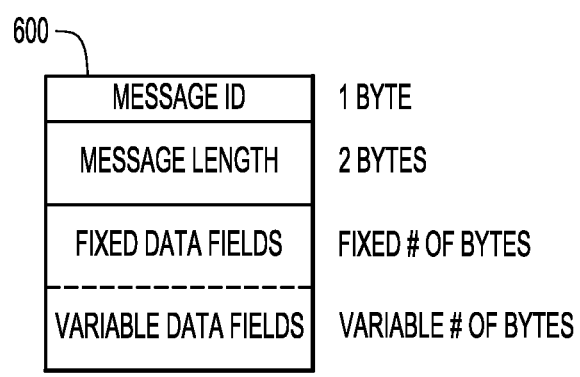
FIG. 6 is an example generic message format for messages that can be exchanged between a master device and a slave device.

Turning to FIG. 6, an example format for a GCP message 600 is illustrated. The Message Identifier is shown as a one-byte value that defines the message type, e.g., the tag as described above, i.e., GCP (tag). The most significant bit may be set to a zero in the request message and may be set to a one in the response message. A message ID of zero may be defined as not valid. The length field is the number of bytes contained in the message starting after the length field and ending at the end of the message. The length includes all fixed and variable length fields following the length field. There may then be one or more fixed parameter fields that are unique to each message. The fixed length fields of GCP often contain a transaction ID and a mode field. The transaction identifier field uniquely identifies each transaction. A transaction includes a request and its matching response. The number space of the Transaction Identifier is unique within the GCP master and GCP slave but not across the two devices. The mode field is used for modifying the action of the message. The mode field is unique per message. There may then be a variable length data field or TLV that is unique to each message. The length of the TLV field may be determined after subtracting the known fixed data fields form the message length. These additional fields are described later.

When GCP is carried over TCP, the length of the message is not important for the TCP transport since TCP will segment the message as needed to fit into an IP packet that conforms to the MTU (maximum transmission unit) of the networking interface. When other transport protocols such as User Datagram Protocol (UDP) or L2TPv3 are used, then a maximum length needs to be observed. In practice, there may be other system restrictions that limit the max size of a GCP message that can be considered on a case-by-case basis.

In one GCP implementation example, the DOCSIS MULPI specification contains an extensive study on how an upstream burst demodulator works and performs. As part of its signaling protocol, the CMTS has to signal to the CM all the configuration parameters for the burst demodulator. These parameters are contained in a DOCSIS MAC management message called the Upstream Channel Descriptor (UCD). If a similar burst demodulator was to be used in a different system but required the same configuration parameters, it may be more convenient to reference the work done in the DOCSIS specification rather than recreating configuration parameters in a new specification. In addition to leveraging existing work, GCP also allows new work in an environment (DOCSIS in this case) to be immediately used in another environment without having to update a separate specification.

As an analogy, GCP permits the definition of a higher-level data structure which then can point to a low-level data structure that is contained elsewhere. As an example, the GCP pointer can be achieved by defining the following variables:
   Vendor ID=4491 (CableLabs)
   Structure ID=35 (DOCSIS UCD)
The vendor ID and structure ID pair can be changed to indicate an allowed set of data structures, as well as the types of register access that may be permitted, e.g., a CableLabs Vendor ID and structure ID pair may specify CCAP component parameters, while a Cisco vendor ID and structure ID pair may specify parameters for configuring a satellite router system, or a MicroStrain vendor ID and structure ID pair may specify parameters for configuring a wireless sensor network.

The MULPI specification is maintained by CableLabs®, so the GCP vendor ID can be set to CableLabs. The MULPI UCD message has a message ID of 35, therefore it is convenient to re-use the same number. This usage of GCP can be referred to as GCP (UCD), with UCD as the tag, as described above. A separate specification could be written that would describe GCP (UCD), what data structures are used, and how they are packed into the GCP message payload, all the while maintaining the originally specified UCD data structure. In other examples, GCP can be used for power management in remote sensor networks or routers in a satellite router configuration where a master router forwards layer 2, 3, or, 4 forwarding table information, Quality of Service (QoS) parameters, security configuration, and the like.

Device communication considerations may include device port and channel numbers. The slave device that is being addressed may have one or more physical ports. Each port may have one or more channels; the combination of port and channel mnemonics is shown in Table 1 below. Several of the GCP messages make use of these fields, e.g., which may be four byte fields. In addition, the GCP header in the network protocol payload has an additional Unit Identifier (UI) field that is described later. The port and channel fields contain a direct reference to the area of the device for which the data structure should be applied. A wild card may be defined for these fields as 0xFFFF, which indicate that the specific port or channel assignment does not apply and that all ports and/or channels should be updated per the GCP request message, i.e., message attributes are to be applied to all Ports and/or Channels. The wild card value, "*" as shown in Table 1, allows for the reduction of signaling messages when there is common configuration across many ports and channels. In another scenario the wild card may be used as if the port and/or channel information is embedded in the data structure and these explicit fields are not required for operation. Examples of usages of these values are shown in Table 1 below:

TABLE 1

Example device management modes.

| Port | Channel | Mnemonic | Comments |
| --- | --- | --- | --- |
| M | N | M, N | Apply message to Port M, Channel N. |
| 0xFFFF | N | *.N | Apply message to channel N of all ports. |

TABLE 1-continued

Example device management modes.

| Port | Channel | Mnemonic | Comments |
| --- | --- | --- | --- |
| M | 0xFFFF | M.* | Apply message to all channels of Port M. |
| 0xFFFF | 0xFFFF | *.* | Apply message to all channels on all ports. |

The numerical values of the ports and channels are application dependent and not dictated by GCP. For example, a general message could be used to assign specific port and channel numbers. Subsequent messages could then use these assigned port and channel numbers. Applications may also sub-divide the port and/or channel number space anyway applicable to represent different types of ports, and/or groups of channels and sub-channels.

Since GCP may be used as a protocol for managing remote devices, GCP contains some basic functions for managing a particular device. Among these functions are ping, reset, and power management. These modes are coordinated using the Device Management message and the Notify message. The following modes available for device management are shown in Table 2 below:

TABLE 2

Example device management modes.

| Mode | Mode description |
| --- | --- |
| Null | The device should respond but take no other action. This message can be used as a ping, a keep-alive, or a test function. |
| Cold Reset | The device should respond and then perform a full reset. When it comes back on-line, it should issue a Notify with the mode set to cold reset. |
| Warm Reset | The device should respond, reset its session information, but retain its current learned configuration. The definition of a warm reset is ultimately application dependent. When it comes back on-line, it should issue a Notify with the mode set to warm reset. |
| Standby | The device should respond and then go to a standby state. The device is in a power-reduced state and can come back to operational mode on its own based upon its own criteria. If it transitions to standby on its own, it should issue a Notify with mode set to standby. |
| Wake-Up | The device should respond and exit standby mode. When it comes back on-line, or if it wakes up on its own, it should issue a Notify with the mode set to wake-up. |
| Power-Down | The device should respond and then power-down. It should not power-up on its own unless it is power cycled or commanded to power-up. If it powers up on its own, it should issue a Notify with power-up set. |
| Power-Up | The device should respond and power-up. When it finishes its power-up cycle, it should issue a Notify. |

The wake-up and power-up messages would typically use the last known slave device IP address. These commands are only effective when there is a valid IP address to communicate with the slave. This implies that in both a slave device's standby and power-down modes, there is at least some circuit that is monitoring the network connection and maintaining network addressing.

GCP as a protocol can evolve as necessary for master and slave communication. Further, various devices may only need a subset of the GCP messages. When GCP is employed and a message is received that is unknown or unsupported, then a specific null response may be generated using a format shown in Table 3 below:

TABLE 3

Example device response message.

| Description | Length | Contents |
|---|---|---|
| Message ID | 1 byte | 0x81 + Message ID from a request message |
| Return Code | 1 byte | 0x01 |

Since GCP request and response messages tend to differ at least by the LSB, the GCP master accepts an unsupported message error response with either the same message number or, e.g., the message number with the LSB set (incremented by one).

Typically, all GCP messages are designed to be exchanged in pairs, e.g., a request and response, as mentioned above. The request and response form a transaction. Each transaction has a transaction ID. The transaction ID is unique within a transport session, such as a TCP connection. If a GCP slave has multiple masters, then the transaction IDs will be considered as separate number spaces as they will be associated with different TCP connections. The transaction ID may be designed to be unique within a given period of time. The definition of this period of time is application dependent and is not specified by GCP. The period of time should exceed the longest expected outstanding transaction.

In addition to a transaction ID on a per message basis, there may be a transaction ID assigned on a per packet basis. Generally, the transaction ID per message is used when the GCP message are randomly multiplexed into a packet and transported. If the GCP messages are sent as a set, then the packet transaction ID can be used for delineation. A transaction ID of all zeros can be reserved to indicate that the transaction ID should be ignored. The GCP master can choose to ignore the message transaction ID, the packet transaction ID, or both. Since GCP is delivered over a reliable protocol such as TCP, TCP will guarantee delivery of both the request and response message. If there is a network error that prevents delivery of these messages, TCP will indicate that network session has been lost. In the event of a lost TCP session, the GCP master and slave message state machines should close out all pending transactions.

Figure 7:
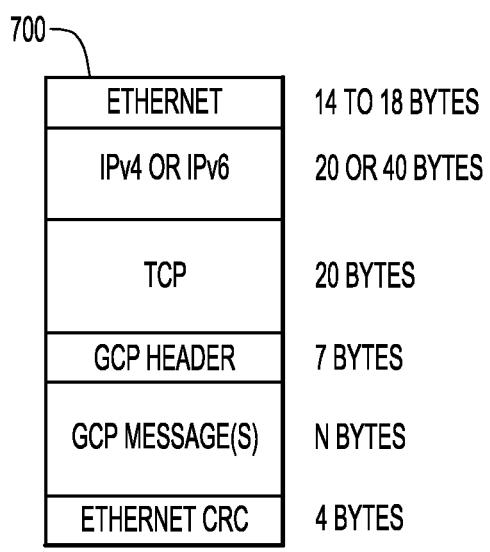
FIG. 7 is an example transport message format for messages that can be transported between a master device and a slave device.
Figure 9A:
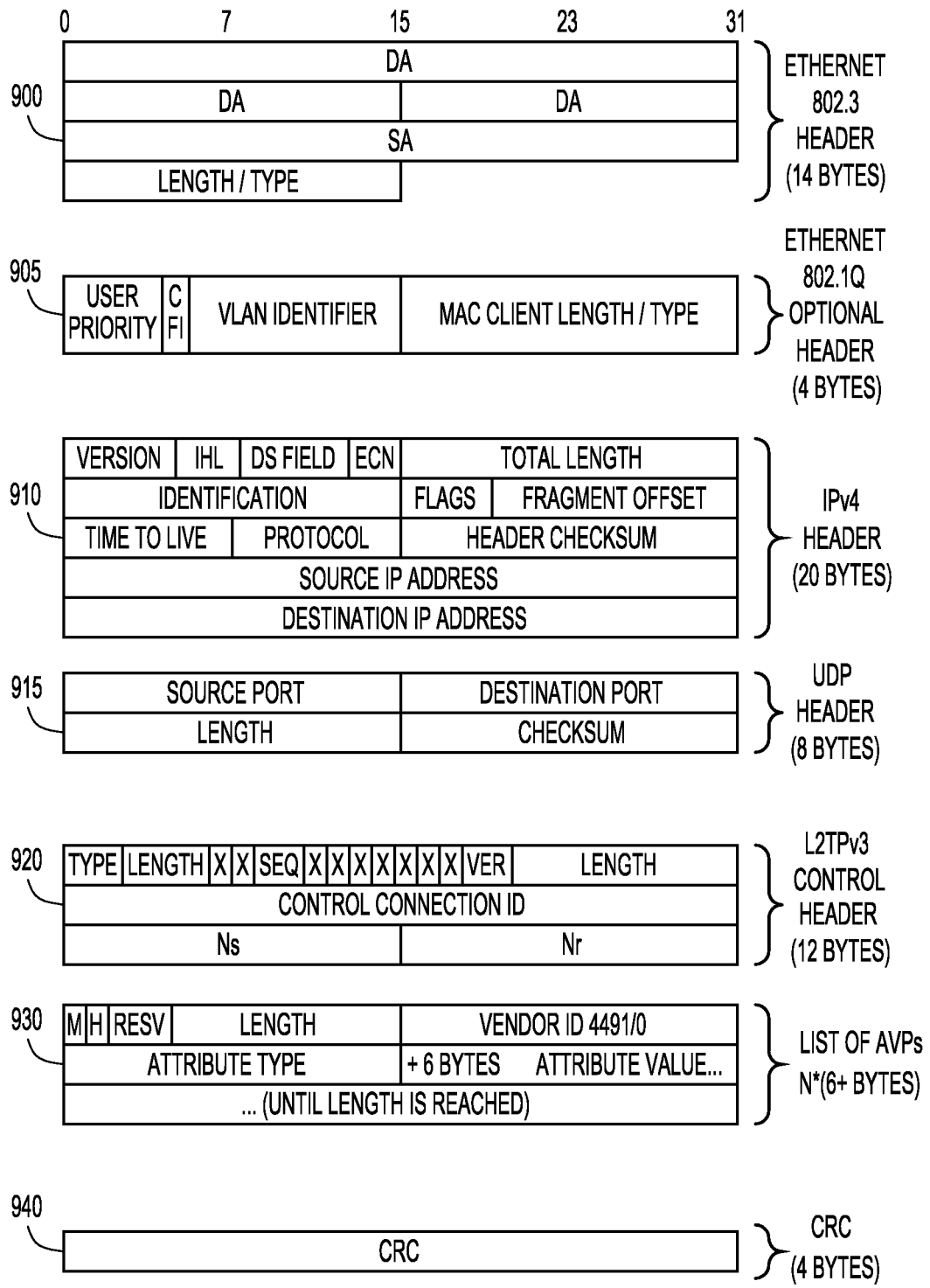
FIG. 9A is an example control plane packet for configuring upstream communication between an M-CMTS and a CCAP access point.

An example transport encapsulation for GCP transport is shown in FIG. 7 and in greater detail in FIG. 9A. In this example, an Ethernet frame 700 is shown with the corresponding Ethernet, IP, and TCP headers, as well as an Ethernet Cyclic Redundancy Check (CRC) footer. The payload of the Ethernet frame has GCP header and GCP payload for transport. In some implementations, when transport does not need to be guaranteed, UDP may be used. For example, implementations that are agnostic to dropped packets or if the implementation has another mechanism for determining message reliability. To facilitate transport, L2TPv3 may be used for tunneling over a layer 3 network, as mentioned above. In this regard, GCP header and message information may be carried in fields 920 and 930, as viewed in FIG. 9A.

Both the GCP master and slave devices can initiate a request message, depending upon the message type. In some implementations, it may be possible for the GCP device to reliably receive a message from TCP and then lose that message internally. If so, the GCP device that initiates a transaction by sending a request message can implement a transaction timer so that it can internally declare a failure when a response message is not received. The value of that timer is application dependent and is not specified by GCP. The intent of this timer is not to replace or supplement the inherent reliability of the transport, but to allow for internal failure of the receiving GCP device. In the event of a missing response message, the sending GCP device should close the current transaction and start a new transaction rather than resending the message request with the previous transaction ID. This type of operation prevents the existence of duplicate messages and permits a more orderly operation of the network. It is possible for a race condition to develop if the response message timeout at the sending GCP device is too quick and the response time from either the GCP Slave or the network in between is too slow. This latency may result in late response messages and redundant transactions, and the GCP device should adjust its timer accordingly or take some other application dependent action.

GCP supports different width data paths on the master and slave devices. Due to the cost sensitivity of the slave device in design or certain markets, the slave device may have an 8-bit, 16-bit, or 32-bit data path. The same could be true for a master device, although a 32-bit master device would be more common. This provides at least three scenarios:

32-bit Master and 32-bit Slave
    32-bit Master and 16-bit Slave
    32-bit Master and 8-bit Slave Since GCP may be typically run over a serialized network connection, in general, there is an automatic conversion between these master and slave environments processing environments.

Structured access uses data constructs such as a TLVs to program functionality in the GCP slave. Structured access allows for more hardware independence and is more of an operational model. Register access uses direct register reads and writes. Register access can be useful for diagnostics or low level driver level access. Example messages used in GCP and their corresponding message ID are shown in Table 4 below:

TABLE 4

Example message IDs for structured access messages.

| Request | Response | Error | Function | Initiator |
|---|---|---|---|---|
| 2 | 3 | 131 | Notify | Slave |
| 4 | 5 | 133 | Device Management | Master |
| 6 | 7 | 135 | Exchange Data Structures (EDS) | Master |

The messaging numbering has been chosen such that the LSB is zero for the request message and a one for the response message. The MSB is a 0 for a request and normal response and a 1 for an error message. GCP Register Message Summary GCP messages fall into two general categories: structured and registered. Register access uses direct register reads and writes. Register access can be useful for diagnostics or low level driver level access. The messages used in GCP a for register access are shown in Table 5 below:

TABLE 5

Example message IDs for register access messages.

| Request | Response | Error | Function | Initiator |
|---|---|---|---|---|
| 16 | 17 | 145 | Exchange Data Registers (EDR) | Master |
| 18 | 19 | 147 | Mask Write Register (MWR) | Master |

GCP unstructured access need not support an explicit and protected read-modify-write operation. A read-modify-write operation is often used in software drivers when a part of a register that is going to be updated and the rest of the register is to remain the same. GCP leaves it up to the higher layer software drivers to ensure that if it does a read-modify-write to a register location, that no other software process writes to the same register location during the read-modify-write. As a quicker and secure alternative to read-modify-write, GCP includes a Mask-Write operation.

Notify messages are sent from a slave to a master. An example notify message is shown in Table 6 below and a normal response from the master is shown in Table 7. When an error occurs, the error message shown in Table 8 may be sent by the master in lieu of or in addition to the response message.

TABLE 6

Example slave device notify message.

| Description | Length | Contents |
| --- | --- | --- |
| Message ID | 1 byte | 2 |
| Message Length | 2 bytes | 8 |
| Transaction ID | 2 bytes | Unique value |
| Mode | 1 byte | bit 7: 0 = Send normal response |
|  |  | 1 = Suppress normalresponse, |
|  |  | bit 6: 0 = Event data is text |
|  |  | 1 = Event data is raw |
|  |  | bit 5-0: Reserved. Set to 0. |
| Status | 1 byte | 0—Null (default) |
|  |  | 1—Cold Reset |
|  |  | 2—Warm Reset |
|  |  | 3—Standby |
|  |  | 4—Wakeup |
|  |  | 5—Power-Down |
|  |  | 6—Power-Up |
|  |  | 7 to 255—Reserved |
| Event Code | 4 bytes | 0x00000000 to 0xFFFFFFFF |
| Event Data | N bytes | Application dependent data. Text or raw format. |

TABLE 7

Example notify response message.

| Description | Length | Contents |
| --- | --- | --- |
| Message ID | 1 byte | 3 |
| Message Length | 2 bytes | 7 |
| Transaction ID | 2 bytes | Same as request |
| Mode | 1 byte | 0 |
| Event Code | 4 bytes | 0x00000000 to 0xFFFFFFFF |

TABLE 8

Example notify error message.

| Description | Length | Contents |
| --- | --- | --- |
| Message ID | 1 byte | 131 |
| Message Length | 2 bytes | 3 |
| Transaction ID | 2 bytes | Same as request |
| Return Code | 1 byte | See Table 24 below |

Device management messages are sent from a slave to a master. The Device Management message defines basic and common powering functions that can be used to manage the endpoint device (acting as a slave). An example Device management message is shown in Table 9 below and a normal response from the master is shown in Table 10. When an error occurs, the error message shown in Table 11 is sent by the master in lieu of or in addition to the response message.

TABLE 9

Example device management message.

| Description | Length | Contents |
| --- | --- | --- |
| Message ID | 1 byte | 4 |
| Message Length | 2 bytes | 8 |
| Transaction ID | 2 bytes | Unique value |
| Mode | 1 byte | bit 7: 0 = Send normal response |
|  |  | 1 = Suppress normal response |
|  |  | bit 6-0: Reserved. Set to 0. |
| Port | 2 bytes | 0 to 0xFFFF |
| Channel | 2 bytes | 0 to 0xFFFF |
| Command | 1 byte | 0—Null |
|  |  | 1—Cold Reset |
|  |  | 2—Warm Reset |
|  |  | 3—Standby |
|  |  | 4—Wakeup |
|  |  | 5—Power-Down |
|  |  | 6—Power-Up |
|  |  | 7 to 255—Reserved |

TABLE 10

Example device management response message.

| Description | Length | Contents |
| --- | --- | --- |
| Message ID | 1 byte | 5 |
| Message Length | 2 bytes | 4 |
| Transaction ID | 2 bytes | Same as request |
| Mode | 1 byte | 0 |
| Return Code | 1 byte | 0 |

TABLE 11

Example device management error message.

| Description | Length | Contents |
| --- | --- | --- |
| Message ID | 1 byte | 133 |
| Message Length | 2 bytes | 3 |
| Transaction ID | 2 bytes | Same as request |
| Return Code | 1 byte | See Table 24 |

Note that there is no explicit command for device identification. Device discovery and identification is application dependent and is not specified by GCP.

The Exchange Data Structures (EDS) message allows data structures that have been well defined in other protocols or new data structures to be tunneled through the GCP protocol. A typical use would be to reuse TLV definitions from one system in a new system. An example EDS request message is shown in Table 12 below and a normal response from the slave is shown in Table 13. When an error occurs, the error message shown in Table 14 is sent by the slave in lieu of or in addition to the response message.

TABLE 12

Example EDS request message.

| Description | Length | Contents |
|---|---|---|
| Message ID | 1 byte | 6 |
| Message Length | 2 bytes | 12 + N (N = data structure length below) |
| Transaction ID | 2 bytes | Unique value |
| Mode | 1 byte | 0x00 |
| Port | 2 bytes | 0 to 0xFFFF |
| Channel | 2 bytes | 0 to 0xFFFF |
| Vendor ID | 4 bytes | 0 to 0xFFFF |
| Vendor Index | 1 byte | 0 to 255 |
| Data Structures | N bytes | Sending Data |

TABLE 13

Example EDS response message.

| Description | Length | Contents |
|---|---|---|
| Message ID | 1 byte | 7 |
| Message Length | 2 bytes | 12 + M (M = data structure length below) |
| Transaction ID | 2 bytes | Same as request |
| Mode | 1 byte | 0x00 |
| Port | 2 bytes | 0 to 0xFFFF |
| Channel | 2 bytes | 0 to 0xFFFF |
| Vendor ID | 4 bytes | 0 to 0xFFFF |
| Vendor Index | 1 byte | 0 to 255 |
| Data Structures | M bytes | Returned Data |

TABLE 14

Example EDS error message.

| Description | Length | Contents |
|---|---|---|
| Message ID | 1 byte | 135 |
| Message Length | 2 bytes | 3 |
| Transaction ID | 2 bytes | Same as request |
| Exception Code | 1 byte | See Table 24 |

EDS data structures could potentially be larger than the MTU of an IP packet. TCP will automatically segment this message if necessary across multiple IP packets. Port and channel usage shown in Tables 12 and 13 has been described in connection with Table 1 above. The Vendor ID field indicates what organization has defined the specific data structures to be used. The Vendor Index is unique to the vendor and chooses a data structure within the Vendors definition. The combination of the Vendor ID and the Vendor Index fields provide a wide choice of data structures. The data structures in the response message may be completely different and of a different length than the data structures in the request message. The message does not contain the length of data structure field. The length is managed by the transport, e.g., TCP.

To perform device access at the register level, GCP uses EDR and MWR messages the corresponding EDR and MWR message IDs are shown in Table 5 above. This message allows one or more registers in the slave device to be written by the master device starting at a specified base address and then have those registers read back in the response message. The message allows a write-only, a read-only, or a write-with-read-back. An example EDR request message is shown in Table 15 below and a normal response from the slave is shown in Table 16. When an error occurs, the error message shown in Table 17 is sent by the slave in lieu of or in addition to the response message.

TABLE 15

Example EDR request message.

| Description | Size | Contents |
|---|---|---|
| Message ID | 1 byte | 16 |
| Message Length | 2 bytes | If No Write, then 9<br>If Write, then >9 |
| Transaction ID | 2 bytes | Unique value |
| Mode | 1 byte | bit 7: 0 = Send normal response (default)<br>1 = Suppress normal response<br>bit 6: 0 = Write, 1 = No Write<br>bit 5: 0 = Read, 1 = No Read<br>bit 4: 0 = Linear Mode (default)<br>1 = FIFO Mode<br>bit 3: 0 = Big Endian (default)<br>1 = Little Endian<br>bit 2-0: 000 = unspecified (default)<br>001 = 8-bit data width<br>010 = 16-bit data width<br>011 = 32-bit data width<br>100 = 64-bit data width<br>101, 110, 111: Reserved. |
| Starting Address | 4 bytes | 0x00000000 to 0xFFFFFFFF |
| Byte Count | 2 bytes | 1 to 65,536 |
| Sent Data | Length—9 bytes | If Write, then data<br>If No Write, then no data. |

TABLE 16

Example EDR response message.

| Description | Size | Contents |
|---|---|---|
| Message ID | 1 byte | 17 |
| Message Length | 2 bytes | If No Read, then 4<br>If Read, then >4 |
| Transaction ID | 2 bytes | Same as request |
| Mode | 1 byte | Same definition as mode field in request. |
| Return Code or Data | 1 byte<br>L—3 bytes | If No Read, then return code = 0<br>If Read, then data. |

TABLE 17

Example EDR error message.

| Description | Size | Contents |
|---|---|---|
| Message ID | 1 byte | 145 |
| Message Length | 2 bytes | 3 |
| Transaction ID | 2 bytes | Same as request |
| Return Code | 1 byte | See Table 24 |

The EDR message is fundamentally a register write with read-back message of which write-only and read-only are subsets of the main message. The default Mode field is all zeros. To write to multiple registers that are not contiguous in memory, multiple EDR messages may be used. Multiple messages may be grouped together into one packet. The normal EDR response message can be suppressed by asserting the "suppress normal response bit". This mode may be useful when a series of back-to-back writes are performed and there is a desire to reduce the workload on the remote device. In the event of an error at the GCP slave, the GCP slave will return an error response with the appropriate error code.

Read and write operations for the EDR request message mode field (bits 5 and 6) are as follows:

TABLE 18

Example EDR read-write modes.

| | |
|---|---|
| W = 0, R = 0 | The data in the request message is written into a register as dictated by the address pointer. The same address point is then used to read back the data. The slave device should perform a true internal write followed by a true internal read rather than just echoing the data back. This command allows the master to verify that the correct values where written. |
| W = 0, R = 1 | The data in the request message is written into a register. The response message has a return code but no data. |
| W = 1, R = 0 | The request message contains an address but no data. The response message contains data from the register at the specified address location |
| W = 1, R = 1 | No reads or writes take place. The error codes are still valid and the GCP slave returns a normal response. This mode is a null mode and may be used to test connectivity. |

Note that a read-modify-write operation would take two separate EDR commands. As an alternative, consider using the MWR message.

For memory addressing (starting address field) when a linear mode (mode bit 4) is specified, the address field is incremented with consecutive writes and/or reads. If a first-in first-out (FIFO) mode is specified, then the address field is held constant. The FIFO mode is for a FIFO input or output that is located at a fixed memory location. For the sent data field, the GCP master and GCP slave may have very different internal architectures. For example, the GCP master may be a high-end processor system with a 32-bit data bus while the GCP slave might be a small embedded processor with an 8-bit or 16-bit data bus. The variation between systems includes data bus width as well as the number of bytes per address location.

Since GCP moves data from one system to the other over a serial transport, there is a natural conversion between the two systems. In the event that the data requires specific handling, such as the preservation of a 32-bit value, GCP allows the data to be identified as such.

TABLE 19

Example EDR additional configuration parameters.

| | |
|---|---|
| Byte stream | The address pointer (starting address) and a byte count can identify the data. The GCP master and slave inherently know what to do. This is the default mode for GCP. |
| N bit. | Data provided is from memory or a register set that is N bit sizes, where N = 8, 16, 32, or 64. |
| Endian | The data can be marked as being big-endian or little-endian. The default mode is big-endian. |

These values are always valid for the data being transported in the request or response messages and may be different between the two messages.

Mask Write Register (MWR) message is used by the GCP master to modify the contents of a specified register in the GCP slave by using a combination of an AND mask, an OR mask, and the register's current contents. The message can be used to set or clear individual bits in the register. As a result, this message can be used to more efficiently replace a read-modify-write operation. An example MWR request message is shown in Table 20 below and a normal response from the slave is shown in Table 21. When an error occurs, the error message shown in Table 22 is sent by the slave in lieu of or in addition to the response message.

TABLE 20

Example MWR request message.

| Description | Length | Contents | |
|---|---|---|---|
| Message ID | 1 byte | 18 | |
| Message Length | 2 bytes | 23 | |
| Transaction ID | 2 bytes | Unique value | |
| Mode | 1 bytes | bit 7: | 0 = Send normal response |
| | | | 1 = Suppress normal response |
| | | bit 6: | 0 = Write |
| | | bit 5: | 0 = Read, 1 = No Read |
| | | bit 4-3: | Reserved. Set to 0. |
| | | bit 2-0: | 001 = 8-bit data width |
| | | | 010 = 16-bit data width |
| | | | 011 = 32 bit data width |
| | | | 100 = 64-bit data width |
| | | | 000, 101, 110, 111: Reserved. |
| Reference Address | 4 bytes | 0x00000000 to 0xFFFFFFFF | |
| AND_Mask | 8 bytes | 8-bit to 64-bit field | |
| OR_Mask | 8 bytes | 8-bit to 64-bit field | |

TABLE 21

Example MWR response message.

| Description | Length | Contents |
|---|---|---|
| Message ID | 1 byte | 19 |
| Message Length | 2 bytes | |
| Transaction ID | 2 bytes | Same as request |
| Mode | 1 bytes | Same definition as mode field in request. |
| Return Code or Data | 1 byte | If No Read, then return code = 0 |
| | 4 bytes | If Read, then data. |

TABLE 22

Example MWR error message.

| Description | Length | Contents |
|---|---|---|
| Message ID | 1 byte | 147 |
| Message Length | 2 bytes | 3 |
| Transaction ID | 2 bytes | Same as request |
| Return Code | 1 byte | See Table 24 |

Read and write operations for the MWR request message mode field (bits 5 and 6) are as follows:

TABLE 23

Example MWR read-write modes.

| | |
|---|---|
| W = 0, R = 0 | The data in the request message is written into a register as dictated by the address pointer. The same address point is then used to read back the data. The slave device should perform a true internal write followed by a true internal read rather than just echoing the data back. This command allows the master to verify that the correct values where written. |
| W = 0, R = 1 | The data in the request message is written into a register. The response message has a return code but no data. |

The normal MWR response message can be suppressed by asserting the "suppress normal response bit". This mode may be useful when a series of back-to-back writes are performed and there is a desire to reduce the workload on the remote device. In the event of an error at the GCP slave, the GCP slave will return an error response with the appropriate error code.

The MWR request message specifies the register to be written, the data to be used as the AND mask, and the data to be used as the OR mask. The number of bytes written and read, and hence the size of the mask is specified in the mode field. When less than 64 bits are used, the least order bytes in the MASK fields may be used. The unused bits in the AND_MASK and OR_MASK field should be set to 0 by the master and ignored by the slave. An example mask function algorithm is:

Result=(Contents AND AND_Mask) OR (OR_Mask AND (NOT AND_Mask))

Using the following 8 bit mask example, the result is 17 hexadecimal:

Format=Hex, Binary
Current Contents=12, 0001 0010
AND_Mask=F2, 1111 0010
OR_Mask=25, 0010 0101
(NOT And_Mask)=0D, 0000 1101
Result=17, 0001 0111

If the OR_Mask value is zero, the result is simply the logical ANDing of the current contents and AND_Mask. If the AND_Mask value is zero, the result is equal to the OR_Mask value.

The GCP response message contains a return or exception code that indicates either success or a specific type of failure. Example return codes are show in Table 24:

TABLE 24

Example GCP return codes.

| Code | Name | No-tify | GDM | EDS | EDR | WMR |
|---|---|---|---|---|---|---|
| 0 | MESSAGE SUCCESSFUL | Y | Y | Y | Y | Y |
| 1 | UNSUPPORTED MESSAGE | n/a | Y | Y | Y | Y |
| 2 | ILLEGAL MESSAGE LENGTH | Y | Y | Y | Y | Y |
| 3 | ILLEGAL TRANSACTION ID | Y | Y | Y | Y | Y |
| 4 | ILLEGAL MODE | Y | Y | Y | Y | Y |
| 5 | ILLEGAL PORT | n/a | Y | Y | n/a | n/a |
| 6 | ILLEGAL CHANNEL | n/a | Y | Y | n/a | n/a |
| 7 | ILLEGAL COMMAND | n/a | Y | n/a | n/a | n/a |
| 8 | ILLEGAL VENDOR ID | n/a | n/a | Y | n/a | n/a |
| 9 | ILLEGAL VENDOR INDEX | n/a | n/a | Y | n/a | n/a |
| 10 | ILLEGAL ADDRESS | n/a | n/a | n/a | Y | Y |
| 11 | ILLEGAL DATA VALUE | n/a | n/a | Y | Y | n/a |
| 12-127 | Reserved | — | — | — | — | — |
| 128-254 | User Defined Codes | — | — | — | — | — |
| 255 | SLAVE DEVICE FAILURE | n/a | Y | Y | Y | Y |

Error codes in this example are assigned in numerical order. If there are multiple errors, only the lowest value error code may be reported.

GCP may also be used in a debug mode in which a master or slave device can be monitored or debugged by each other, another application, or by a user via a user interface. UEPI control plane operation is described next.

UEPI Control Plane Operation

As shown in FIG. 1, DEPI, UEPI and GCP pseudowires are carried over communication link 195. The UEPI pseudowires carry upstream data plane information and control plane information for upstream communication. The UEPI control plane can configure point-to-point (P2P) between a CMTS core and CCAP access point, and point-to-multipoint (P2MP) communication between a CMTS single MAC and multiple CCAP access points.

Typically, there is one tunnel between each unique combination of CMTS core and CCAP access point. A tunnel has a unique pairing of source and destination IP addresses and may support multiple transport sessions. A pseudowire is implemented via a single session with a corresponding session ID. Each DEPI and UEPI transmitter has a unique transport stream ID (TSID) and each DEPI and UEPI receiver has a unique receive stream ID (RSID). By implementing the techniques described herein DEPI and UEPI can share the same tunnel with each UEPI logical channel having its own pseudowire. Accordingly, each CMTS core and CCAP access point pair can support at least two logical channels; one for DEPI and one for UEPI. The logical channel assignment is within the RSID. For example, an RSID is eight bits and has the following format: where {Channel number=bits 7 to 1, Logical channel=bit 0}. In one possible implementation, DEPI and UEPI can use separate pseudowires so that encapsulation options do not get mixed between the two. Alternatively, DEPI and UEPI could share a common session for a transmit and receive matched pair.

Figure 8:
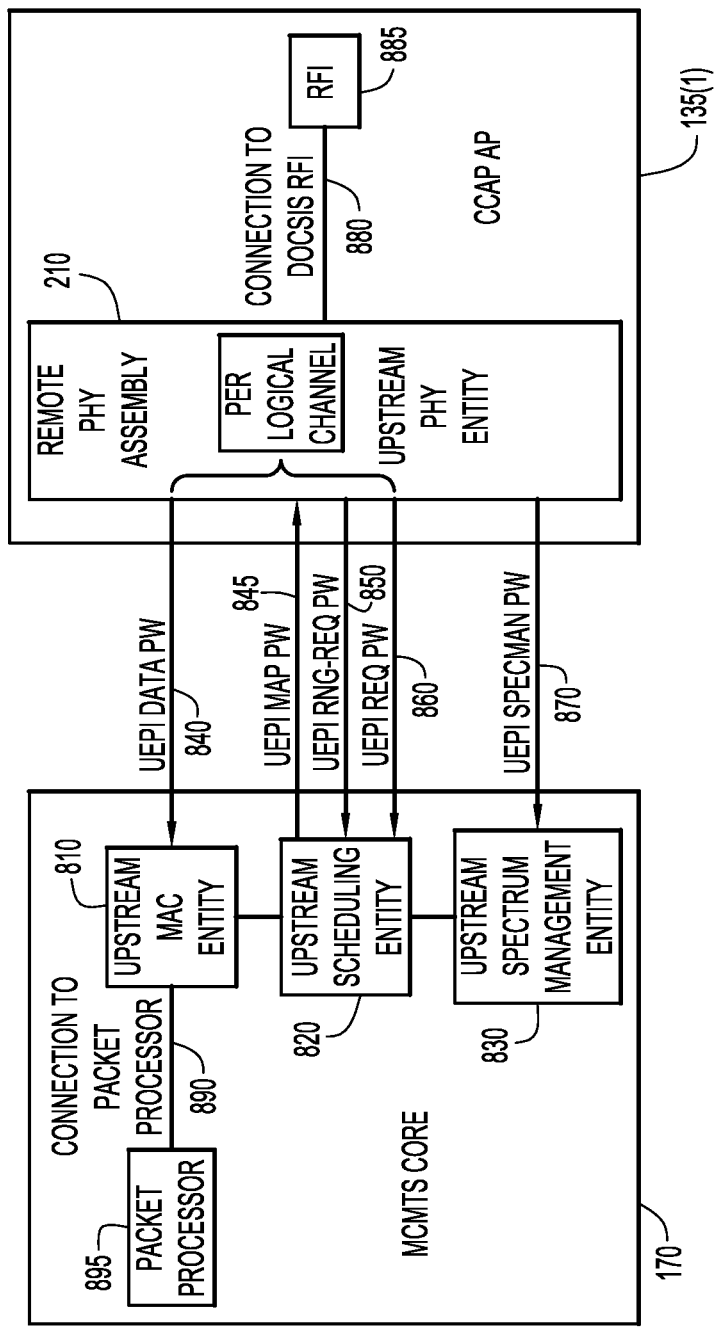
FIG. 8 is an example block diagram of a pseudowire arrangement between an M-CMTS and a CCAP access point for handling upstream traffic.

Referring now to FIG. 8, an example block diagram of UEPI pseudowires between an M-CMTS core and a CCAP access point for handling upstream traffic is now described. In this example, pseudowires are shown between M-CMTS core 170 (FIG. 1) and CCAP AP 135(1) (FIG. 2). CMTS core 170 is divided into three logical entities that include an upstream MAC entity 810, an upstream scheduling entity 820, and an upstream spectrum management entity 830. CCAP AP 135 (1) is shown with the remote PHY assembly 210 (FIG. 2). Five pseudowires are shown that include a data plane message, UEPI data pseudowire 840; and four control plane pseudowires: a UEPI MAP pseudowire 845, a UEPI range-request (RNG-REQ) pseudowire 850, a UEPI REQ pseudowire 860, and a UEPI spectrum management (SpecMan) pseudowire 870. The CCAP AP 135(1) is connected to a DOCSIS RF interface (RFI) 885 via link 880 while the upstream MAC entity 810 is connected to a packet processor 895 via link 890.

The UEPI data pseudowire 840 is used to forward upstream traffic, e.g., data from a CM, to the CMTS core 170 for further forwarding by packet processor 895. The UEPI MAP pseudowire 845 provides scheduling information, e.g., time slots and contention periods, to downstream devices. The UEPI RNG-REQ pseudowire 850 requests ranging information so that downstream devices, e.g., CMs or DOCSIS gateways, can transmit upstream packets to arrive upstream within a scheduled time slot.

The UEPI REQ pseudowire 860 carries any other requests from the downstream devices. Although the pseudowires are described as being separate, the underlying messages may be shared over a single pseudowire. For example, messages for the MAP, REQ, and RNG-REQ pseudowires could be sent over a single pseudowire. It should be noted that the PHY configuration for Advanced Time Division Multiple Access (ATMDA) and Synchronous Code Division Multiple Access (SCDMA) parameters needed to configure the CCAP access point are defined in MULPI and could be sent to the CCAP access point using GCP. The SpecMan pseudowire 870 is used to manage upstream spectrum between the CCAP access point and the M-CMTS core.

UEPI has two modes, a basic mode and an advanced mode. In the UEPI advanced mode, all pseudowires are employed, as described later. In the UEPI basic mode, the CMTS sends the DOCSIS MAP over the DEPI pseudowire. The CCAP AP extracts the MAP from the DEPI pseudowire. The CCAP AP sends data, REQ messages, and RNG-REQ messages to the CMTS over the UEPI Data pseudowire. In this mode, UEPI MAP, RNG-REQ, REQ, and SpecMan pseudowires do not get used. Alternatively, the CMTS sends a MAP message on the UEPI MAP pseudowire. The CMTS can send a MAP in the DEPI session, but the CCAP AP is configured to ignore that MAP message when MAPs are being received via UEPI. The MAP message in the DEPI session propagates to the CMs. This allows the MAP to get to the CCAP AP earlier which reduces the MAP advance time. In another example, if DEPI is configured to use Packet Streaming Protocol (PSP), then the CCAP AP could take the MAP message from the UEPI MAP pseudowire and inject it into the CCAP AP downstream. PSP is a layer-3 convergence layer protocol, which allows packets to be consecutively streamed together and fragmented at arbitrary boundaries. PSP facilitates QoS.

The upstream scheduling entity 820 (or scheduler) generates MAPs using the REQ and RNG-REQ messages. The scheduler is shown in the CMTS, but may be placed in the CCAP AP, depending on system design. When the scheduler resides in the CCAP AP, the REQ, RNG-REQ, and MAP pseudowires can be eliminated. When the upstream scheduler is remote, e.g., as part of the CCAP access point, a couple of scheduling methods may be employed: 1) Publish an interface, e.g., DEPI, UEPI, and GCP with extensions, and the CCAP AP writes its own scheduler, or 2) the scheduler may be published, e.g., as a Linux loadable module with an API pushed by CMTS at boot time or in real-time to the CCAP access point. When a loadable module is published, the upstream scheduler "appears" as an application to the CCAP access point.

Even though the US scheduler is remote, the DOCSIS signaling can remain centralized with few limited exceptions. When the scheduler is remote the DOCSIS MAP message can be sent from the CCAP access point to the CMs and does not originate at the CMTS core. The synchronization (SYNC) message is sent from the CCAP access point and the ranging interval is initiated by the CCAP access point. Any CM initiated messages are responded to by the CMTS. Furthermore, many of the MAC management messages can be moved to the CCAP access point. When channel bonding is in use, the upstream bonding may be configured to terminate in the CCAP access point with data forwarded over fiber to the CMTS core. In a similar manner a DOCSIS framer, e.g., for encapsulating DOCSIS MAC frames, can be positioned remotely as part of a CCAP access point. A remote scheduler AVP for UEPI and a remote DOCSIS framer AVP are described below in connection with FIG. 9D.

To facilitate UEPI control plane messages, L2TPv3 encapsulation is used with customized Attribute-Value Pairs (AVPs). An example control plane packet format is shown in FIG. 9A. The packet has a standard Ethernet header 900 and CRC 940. Within the Ethernet packet 900 is an optional VLAN header, an IPv6 or IPv4 header 910, an optional UDP header 915, an L2TPv3 control header 920, and a list of one or more L2TPv3 AVPs 930. The custom AVPs carry the UEPI upstream communication configuration parameters associated with the MAP, REQ, RNG-REQ, and SpecMan UEPI pseudowires. The custom AVPs are described in detail hereinafter in connection with FIGS. 9B-9E.

As viewed in FIG. 9A, L2TPv3 header 920 follows the standard format parameters. These fields follow the L2TPv3 Request for Comments (RFC) 3931 definitions for connection setup, flow, and teardown. The data field carries the custom AVP information for the UEPI control plane. AVPs 930 comprise M, H, length, vendor ID, attribute type, attribute value, and fields. The one bit mandatory (M) field determines whether or not the AVP is important enough to tear down the L2TPv3 connection and the hidden (H) fields indicates whether or not encryption is used. Encryption is not necessary for UEPI messages. The length is equal to the length of the attribute value field plus six bytes. The vendor ID field is zero for standard AVPs and 4491 for UEPI specific AVPs. The vendor ID of 4491 indicates that the vendor is CableLabs®.

Custom AVPs are described herein to setup each of the four control plane UEPI pseudowire types. Standard L2TPv3 AVPs are not described herein. For a UEPI pseudowire interfacing with the upstream scheduling entity 820, custom AVPs may include TLVs for ATDMA and SCDMA parameters, e.g., Upstream Channel Descriptors (UCDs); and scheduling parameters, e.g., various dynamic QoS parameters such as dynamic service parameters (DSx), where "x" represents add, change, or delete an identified parameter.

When UEPI spanning is employed (MP2P) when viewed from the CCAP access point, a spanning basic mode and an advanced mode are available. Thus, a single CMTS MAC can support more than one CCAP access point PHY. For example, two 4 channel CCAP access point PHYs may connect to one 4 channel CMTS MAC. In basic mode, the CMTS MAC bandwidth is the same as the PHY bandwidth. For example, a single CMTS MAC that supports four channels with a combined bandwidth of 100 Mbps that all feed a CCAP access point MAC that also has 100 Mbps of bandwidth. Since there is a unique tunnel between each CMTS and CCAP access point device, there is no need for additional bandwidth management for UEPI Spanning. In this scenario, all CCAP access points that share the same physical channels are in the same MAC domain. The downstream sessions that are associated with the MAC domain must be equivalent or a super set of the upstream sessions The same spanned DOCSIS channels, but on different CCAP access point devices, are assigned the same DOCSIS upstream channel ID. The two channels share the same station ID and Service Flow address space. There are no duplicate CM SIDs (Station Identifiers) or SG (Service Groups) across the two upstreams. The same DOCSIS upstream bandwidth MAP MAC management message is sent to both CCAP APs on the downstream. The MAP controls upstream bandwidth. Since the CM SIDs are unique, only one upstream on one DOCSIS access point will transmit at a time for a particular channel. During ranging, it is possible to get packets from both CCAP APs. Collisions will only occur within an upstream channel within a DOCSIS access point. Thus, initial ranging will actually be more efficient. Requests may originate from either DOCSIS access point during a broadcast request slot. The CMTS will accept the separate Request streams.

When UEPI is in the advanced mode, the combined CMTS MAC domain bandwidth could be larger than the individual channel bandwidth of each PHY. The total bandwidth does not have to equal the sum of each of the individual bandwidths. In this scenario, the CMTS scheduler is aware of which CMs are serviced by which DOCSIS access point. The scheduler would then perform a bandwidth calculation for each CCAP AP and then perform a second bandwidth calculation for the shared upstream session. Alternatively, each CCAP AP could have its own MAP and its own session, but the CMTS would still consider them in the same MAC domain. This option is not really spanning but may be used when combining upstreams with DEPI downstreams that are spanned.

Figure 9B:
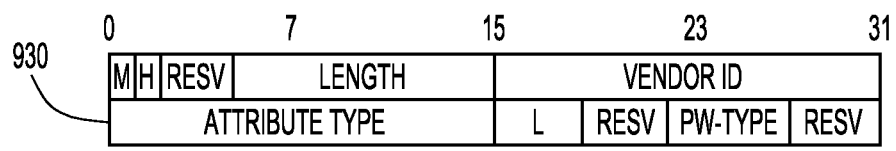
FIGS. 9B-9e are example upstream communication control plane message formats.

UEPI uses the some of the same AVPs as DEPI but with additional extensions to setup the UEPI pseudowire. Referring to FIGS. 9B-9E, example AVP message formats for UEPI are described. For each of the formats shown in FIGS. 9B-9E, the M, H, RESV, length, vendor ID, and attribute type field operate as described above. FIG. 9B depicts field 930 from FIG. 9A for an example pseudowire type message. In this example, a lock (L) bit and a pseudowire (PW) type field has been added. The L bit indicates whether or not a particular parameter should be "locked". For example, access points may be configured by way of a separate control system or the CMTS. The L bit prevents one control mechanism from overwriting another control system. When set to zero the L bit may indicate that the parameter is read-only, while a setting of one indicates that the parameter is read-write.

The pseudowire sub-type (one byte) has the following options:
  Type 0=PSP default mode as defined by the DEPI-108 specification (or a later version) maintained by Cable-Labs®
  Type 1=DEPI Multi-channel MPEG (MCM) pseudowire
  Type 2=DEPI MCM/Multi-channel Launch (MCL) pseudowire
  Type 3=UEPI Data pseudowire
  Type 4=UEPI MAP pseudowire
  Type 5=UEPI REQ pseudowire
  Type 6=RNG-REQ pseudowire
  Type 7=SpecMan pseudowire
  Types 8-255=Reserved Thus, pseudowire sub-type allows the endpoints, e.g., the CMTS core and the CCAP access point, to send messages over the correct pseudowire.

Figure 9C:
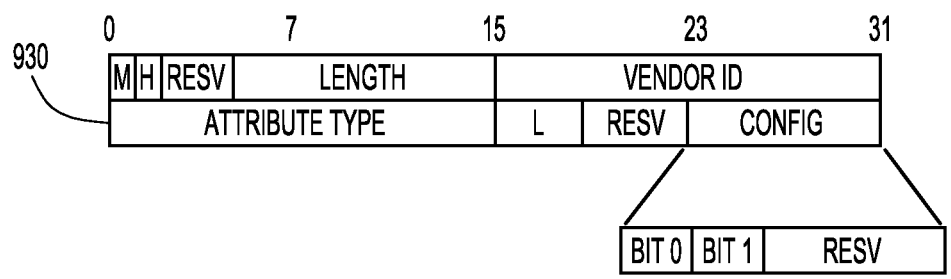

FIG. 9C depicts an example AVP for spanning. In this example, the PW-type field is replaced with a configuration (config) field. The config field has two active bits, zero and one. Bit 0, when set to one, indicates that downstream UEPI spanning is active and when set to zero, indicates that downstream UEPI spanning is inactive.

Figure 9D:
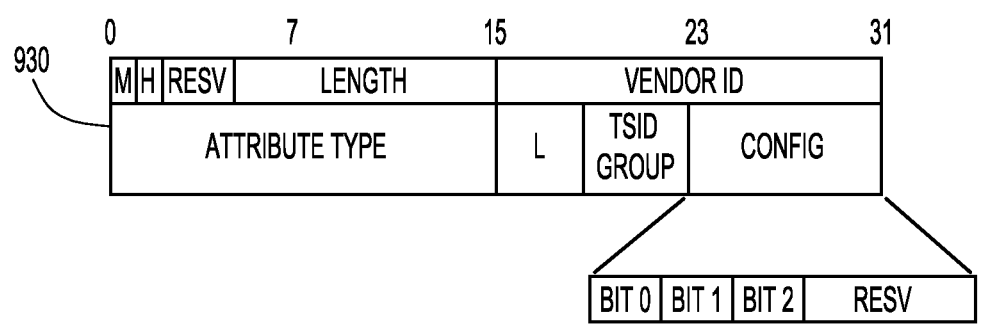

FIG. 9D depicts an example AVP for configuring remote resources, such as the remote scheduler and remote framer, as described above. In this example, the config field uses four bits, zero, one, two and three. Bit 0, when set to one, indicates that an upstream scheduler is remotely positioned and when set to zero, indicates that upstream scheduler is centralized, e.g., associated with the CMTS. Similarly, bit 1 is set to indicate whether the downstream scheduler is remote or centralized. Bit 2, when set to one, indicates that upstream framer is remote and when set to zero, indicates that upstream framer is centralized. Similarly, bit 3 is set for a downstream framer is remotely positioned and when set to zero, indicates that the downstream framer is centralized.

Figure 9E:
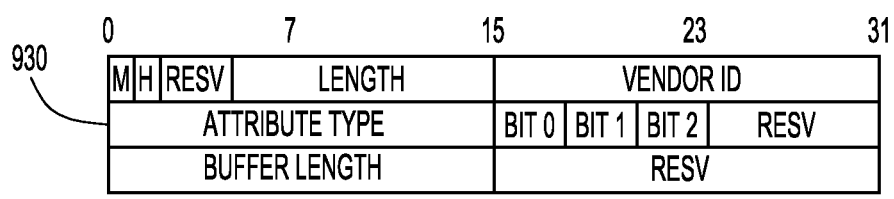

FIG. 9E depicts an example AVP for configuring Motion Pictures Expert Group (MPEG)-Transport Stream (TS) over DOCSIS. In this example, the config field uses three bits, zero, one, and two, and adds a two byte buffer length field. Bit 0, when set to one, indicates that DOCSIS video is enabled, and when set to zero, indicates that DOCSIS video is disabled. Bit 1 is set to indicate whether or not time based queuing is enabled. Time based queuing allows the selective emptying of a queue, e.g., for video buffer contents. Bit 2 indicates whether or not program clock reference (PCR) correction is enabled. PCR correction allows the presentation of synchronized video/audio content and aids in reducing jitter due to packet based transmission as well as other system time or synchronization anomalies.

As mentioned above, AVPs can be configured to transmit ATDMA and SCDMA parameters, e.g., UCDs. Further, scheduling parameters, e.g., various dynamic QoS parameters such as dynamic service parameters (DSx), where "x" represents add, change, or delete an identified parameter can be sent via UEPI AVPs.

In summary for access point embodiments, the access point may be a CCAP access point. The access points have a network interface and a coaxial interface and control plane information is received from a CMTS via the network interface, where the control plane information is designed to configure the access point to enable communication over the network interface and the coaxial interface. At the access point, data plane and control plane information is received from the CMTS, and the data plane information transmitted via the coaxial interface to one or more customer termination devices.

The access point is booted, authenticated, and configured, e.g., using GCP. Layer 3 tunnels are established that may comprise DEPI, UEPI, and a GCP pseudowires between the CMTS and the access point. Data plane information is received via the coaxial interface and transmitted to the CMTS via the network interface. It may be determined whether the access point should have a software or firmware image upgrade and the access point software or firmware image is upgraded when necessary. Clocking parameters, IEEE 1588 clocking, may be established for the access point.

In summary for GCP embodiments, at a master device a generic control protocol (GCP) control message is generated that is configured to manage a slave device, where the control message includes one or more of structured access fields and register access fields, and where the structured access fields include one or more of (i) a device management message configured to provide basic device control and (ii) an exchange data structure message configured with a payload field configured to store a data structure from another protocol, and where the register access fields include one or more of (i) an exchange data registers message configured to read and write to a register in the slave device and (ii) a mask write register message configured to write to individual bits of a register in the slave device. The control message is transmitted to the slave device.

In summary for UEPI control plane embodiments, the UEPI control plane defines how to set up sessions for UEPI data connections and scheduling, and ranging over DEPI. Additionally, UEPI is extended for P2MP operation which facilitates downstream Modular Headend Architecture (MHA) multicast operation. Further, the UEPI control plane extends M-CMTS concepts to allow the entire CMTS PHY to be separately located as a CCAP AP or PHY in an optical node (the CCAP AP can be an optical node). Optical nodes are useful for implementing a digital return path. A digital return path allows for cheaper return path optics and allows the analog return path to be terminated in the optical node, thereby increasing the dynamic range on a return path by eliminating laser clipping.

From the foregoing description, it will be appreciated that embodiments described herein make available a novel method, apparatuses, and system for control plane for configuring remote DOCSIS devices, where the method, apparatuses, and system enable a cable system operator or multi system/service operators (MSOs) in cable system environment to automatically configure and operate a remote PHY device. It should be appreciated that the techniques described herein may be applied to any M-CMTS architecture with a distributed MAC and/or PHY layer QAM, e.g., within CMTS chassis line cards or any associated rack equipment.

Having described preferred embodiments of new techniques for a control plane to configure remote DOCSIS devices, it is believed that other modifications, variations and changes will be suggested to those skilled in the art in view of the teachings set forth herein. It is therefore to be understood that all such variations, modifications and changes are believed to fall within the scope defined by the appended claims.

The above description is by way of example only.

What is claimed is:
1. A method comprising:
at a Modular Cable Modem Termination System (M-CMTS) core to support downstream and upstream communications to and from downstream customer premise equipment (CPE) through an access point, implementing an Upstream External PHY Interface (UEPI) protocol with an access point for control of the upstream communication, the implementing including:
generating first UEPI control messages comprising information to configure one or more pathways with the access point for data plane upstream communication and control plane communication;
transmitting the first UEPI control messages to the access point; and receiving from the access point second UEPI control messages including a spectrum management message to manage upstream spectrum between the access point and the M-CMTS core, and a range request message to request ranging information so that the CPE can transmit upstream packets within an upstream timeslot, wherein at least one second UEPI control message is forwarded from the (CPE).

2. The method of claim 1, wherein receiving further comprises receiving a request message configured to provide any other request originating from a downstream device.

3. The method of claim 1, further comprising:
generating a third UEPI control message configured to indicate upstream timeslot and contention information and grant or deny upstream transmission based on the range request message; and
transmitting the third UEPI control message to the access point.

4. The method of claim 3, wherein the third UEPI control message is configured to partially grant permission for upstream transmission.

5. The method of claim 1, wherein the first UEPI control messages comprise information to supply timing parameters for upstream transmission.

6. The method of claim 1, wherein receiving and transmitting are performed via pseudowires, and the first UEPI control messages comprise information to define a pseudowire type comprising an upstream data plane pseudowire for receiving upstream data plane transmissions from the CPE forwarded by the access point, a spectrum management pseudowire to convey the spectrum management message, a range request pseudowire to convey the range request message, and at least one of a request pseudowire and a pseudowire type that combines one or more of upstream data plane traffic, spectrum management messages, range request messages, and request messages.

7. The method of claim 6, wherein the pseudowires are configured to use a Layer 2 Tunneling Protocol (L2TP).

8. The method of claim 7, wherein the pseudowires are configured to carry attribute-value pairs (AVPs) comprising information to facilitate upstream communication between the access point and the M-CMTS core.

9. The method of claim 1, wherein the first UEPI control messages comprise information to enable at least two of downstream spanning in which a media access control (MAC) layer in the M-CMTS core is configured to support a physical layer (PHY) in multiple access points, transmission scheduler placement in the M-CMTS core or the access point, transmission scheduler placement in the M-CMTS core or the access point, Data-Over-Cable Service Interface Specification (DOCSIS) framer placement in the M-CMTS core or the access point, and Motion Pictures Expert Group (MPEG)-Transport Stream (TS) over DOCSIS configuration.

10. An apparatus comprising:
a first network interface to support downstream and upstream communications to and from downstream customer premise equipment (CPE) through access points; and
a first processor configured to implement an Upstream External PHY Interface (UEPI) protocol with an access point for control of the upstream communication, wherein the processor is configured to:
generate first UEPI control messages comprising information to configure one or more pathways with the access point for data plane upstream communication and control plane communication;

transmit the first UEPI control messages to the access point; and receive second UEPI control messages from the access point, wherein at least one second control message is forwarded from the CPE, wherein the second UEPI control messages comprise a spectrum management message, a range request message, and a request message, and wherein the spectrum management message is configured to manage upstream spectrum between the access point and the apparatus, the range request message is configured to determine range between the CPE and a scheduler so that the CPE can transmit upstream packets within an upstream timeslot, and the request message is configured to provide any other request originating from the CPE.

11. The apparatus of claim 10, wherein when a request message is received via the first network interface that comprises information configured to request upstream capacity for upstream data plane traffic from the CPE, the first processor is further configured to:

generate a third UEPI control message configured to grant or deny upstream transmission based on the request message; and transmit the third UEPI control message to the access point via the first network interface.

12. The apparatus of claim 10, wherein the first processor is configured to receive and transmit via one or more pseudowires that are configured to use a Layer 2 Tunneling Protocol (L2TP), and the first UEPI control messages comprise information to define a pseudowire type comprising an upstream data plane pseudowire for receiving upstream data plane transmissions from the CPE forwarded by the access point, a spectrum management pseudowire, a range request pseudowire, and at least one of a request pseudowire and a pseudowire type that combines one or more of upstream data plane traffic, spectrum management messages, range request messages, and request messages.

13. The apparatus of claim 12, wherein the pseudowires are configured to carry attribute-value pairs (AVPs) comprising information to facilitate upstream communication from the access point.

14. A system comprising the apparatus of claim 10, further comprising the access point, wherein the access point further comprises:

a second network interface for communication with an access point; and
a coaxial interface for communication with the CPE;
a second processor configured to:
receive the first and third UEPI control messages from the apparatus; and
transmit the second UEPI control messages to the apparatus.

15. The system of claim 14, further comprising the scheduler, wherein the second processor is further configured to:

generate a scheduling message comprising information configured to schedule upstream communication from the CPE; and
transmit the scheduling message to the CPE.

16. The system of claim 15, wherein the coaxial interface is configured to receive upstream communication from the CPE and the second processor is further configured to forward the upstream communication to the apparatus via the second network interface.

17. The system of claim 14, further comprising a Data-Over-Cable Service Interface Specification (DOCSIS) framer configured to decapsulate DOCSIS frames received from the CPE to obtain underlying information, wherein the second processor is further configured to:

encapsulate the underlying information into packets for transmission over a packet based network; and
transmit the packets to the apparatus.

18. One or more non-transitory computer readable media encoded with instructions that, when executed by a processor of a Modular Cable Modem Termination System (M-CMTS) core that supports downstream and upstream communications to and from downstream customer premise equipment (CPE) through an access point, cause the processor to:

implement an Upstream External PHY Interface (UEPI) protocol with an access point for control of the upstream communication, wherein the instructions to cause the processor to implement include instructions to cause the processor to:

generate first UEPI control messages comprising information to configure one or more pathways with the access point for data plane upstream communication and control plane communication;

transmit the first UEPI control messages to the access point; and receive from the access point second UEPI control messages including a spectrum management message to manage upstream spectrum between the access point and the M-CMTS core, and a range request message to request ranging information so that the CPE can transmit upstream packets within an upstream timeslot, wherein at least one second UEPI control message is forwarded from the (CPE).

19. The computer readable media of claim 18, wherein the instructions to cause the processor to implement include further instructions to cause the processor to:

generate a third UEPI control message configured to indicate upstream timeslot and contention information and grant or deny upstream transmission based on the range request message; and transmit the third UEPI control message to the access point.

20. The computer readable media of claim 19, wherein the third UEPI control message is configured to partially grant permission for upstream transmission.

21. The computer readable media of claim 18, wherein the first UEPI control messages comprise information to supply timing parameters for upstream transmission.

22. The computer readable media of claim 18, wherein the instructions to cause the processor to receive and transmit including instructions to cause the processor to receive and transmit via pseudowires, and the first UEPI control messages comprise information to define a pseudowire type comprising an upstream data plane pseudowire for receiving upstream data plane transmissions from the CPE forwarded by the access point, a spectrum management pseudowire to convey the spectrum management message, a range request pseudowire to convey the range request message, and at least one of a request pseudowire and a pseudowire type that combines one or more of upstream data plane traffic, spectrum management messages, range request messages, and request messages.

23. The computer readable media of claim 22, wherein the pseudowires are configured to use a Layer 2 Tunneling Protocol (L2TP) and carry attribute-value pairs (AVPs) comprising information to facilitate upstream communication between the access point and the M-CMTS core.

24. The computer readable media of claim 18, wherein the first UEPI control messages comprise information to enable at least two of downstream spanning in which a media access control (MAC) layer in the M-CMTS core is configured to support a physical layer (PHY) in multiple access points, transmission scheduler placement in the M-CMTS core or the access point, transmission scheduler placement in the M-CMTS core or the access point, Data-Over-Cable Service Interface Specification (DOCSIS) framer placement in the M-CMTS core or the access point, and Motion Pictures Expert Group (MPEG)-Transport Stream (TS) over DOCSIS configuration.

* * * * *